(12) United States Patent
Shimada et al.

(10) Patent No.: US 9,712,615 B2
(45) Date of Patent: Jul. 18, 2017

(54) INFORMATION ACQUISITION METHOD, COMPUTER SYSTEM, AND MANAGEMENT COMPUTER

(75) Inventors: Keita Shimada, Tokyo (JP); Yoshifumi Takamoto, Tokyo (JP); Takashi Tameshige, Tokyo (JP); Kentarou Watanabe, Tokyo (JP); Yutaka Kudo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 14/395,517

(22) PCT Filed: Apr. 23, 2012

(86) PCT No.: PCT/JP2012/060813
§ 371 (c)(1),
(2), (4) Date: Oct. 20, 2014

(87) PCT Pub. No.: WO2013/160983
PCT Pub. Date: Oct. 31, 2013

(65) Prior Publication Data
US 2015/0095424 A1 Apr. 2, 2015

(51) Int. Cl.
*G06F 15/173* (2006.01)
*H04L 29/08* (2006.01)
(Continued)

(52) U.S. Cl.
CPC ...... *H04L 67/1095* (2013.01); *G06F 11/0709* (2013.01); *G06F 11/0766* (2013.01);
(Continued)

(58) Field of Classification Search
CPC .......... H04L 41/0893; H04L 41/085–41/0853
See application file for complete search history.

(56) References Cited

U.S. PATENT DOCUMENTS

| | | | |
|---|---|---|---|
| 5,966,509 A * | 10/1999 | Abe | H04L 12/24 709/222 |
| 2003/0061339 A1* | 3/2003 | Benfield | H04L 41/0213 709/224 |

(Continued)

FOREIGN PATENT DOCUMENTS

| | | |
|---|---|---|
| JP | 10-334013 A | 12/1998 |
| JP | 2000-267899 A | 9/2000 |

(Continued)

OTHER PUBLICATIONS

Extended European Search Report received in corresponding European Application No. 12875681.4 dated Oct. 29, 2015.

(Continued)

*Primary Examiner* — Brendan Higa
(74) *Attorney, Agent, or Firm* — Mattingly & Malur, PC

(57) ABSTRACT

An information acquisition method whereby a management computer provided with a processor, a memory, and an interface acquires information of a plurality of computers via a network, the method including: a first step in which the management computer sets, in acquisition group information, a group of computers for acquiring information among the plurality of computers; a second step in which the management computer determines a sequence in which information is acquired for each group, then determines the sequence of computers for acquiring information in the group; a third step in which the management computer outputs an instruction for acquiring information of computers in the determined sequence; and a fourth step in which an information acquisition execution unit acquires the information of the computers of each group in the determined sequence on the basis of the instruction to acquire the information.

11 Claims, 36 Drawing Sheets

(51) Int. Cl.
  *H04L 12/24* (2006.01)
  *G06F 11/07* (2006.01)
  *G06F 11/30* (2006.01)

(52) U.S. Cl.
  CPC ...... *G06F 11/3006* (2013.01); *G06F 11/3051* (2013.01); *G06F 11/3089* (2013.01); *H04L 41/0853* (2013.01); *H04L 41/0893* (2013.01)

(56) References Cited

U.S. PATENT DOCUMENTS

| | | |
|---|---|---|
| 2007/0168526 A1 | 7/2007 | Ueno |
| 2009/0300428 A1 | 12/2009 | Matsumoto et al. |
| 2010/0083263 A1 | 4/2010 | Machida |
| 2010/0146103 A1* | 6/2010 | Hisatomi ............ H04L 12/2602 709/224 |
| 2011/0314330 A1 | 12/2011 | Morimura et al. |

FOREIGN PATENT DOCUMENTS

| | | |
|---|---|---|
| JP | 2007-334716 A | 12/2007 |
| JP | 2010-134874 A | 6/2010 |
| WO | 2008/056682 A1 | 5/2008 |
| WO | 2009/144969 A1 | 12/2009 |

OTHER PUBLICATIONS

Bass, E. W. et al., "Rapid Software Development for Multi-Vendor Services", Bell Labs Technical Journal, Feb. 1, 2005, pp. 155-169, vol. 9, No. 4, Wiley, CA.

International Searching Authority, International Search Report, Received in International Application No. PCT/JP2012/060813, mailed Jun. 5, 2012, with English Translation.

International Searching Authority, Written Opinion, Received in International Application No. PCT/JP2012/060813, mailed Jun. 5, 2012.

* cited by examiner

| | | SERVER 1 | SERVER 2 | SERVER 3 | SERVER 4 | VIRTUAL SERVER 1 |
|---|---|---|---|---|---|---|
| 601 | NODE ID | SERVER 1 | SERVER 2 | SERVER 3 | SERVER 4 | VIRTUAL SERVER 1 |
| 602 | MANAGEMENT IP ADDRESS | 1.1.1.10 | 1.1.1.12 | 1.1.1.13 | 1.1.1.11 | 1.1.1.14 |
| 603 | AUTHENTICATION INFORMATION | Administrator: Password1 | Administrator: Password2 | Administrator: Password3 | root: Password4 | Root: Password5 |
| 604 | OS | COMPANY M Sv2003 | COMPANY M Sv2008 | COMPANY M Sv2008 | COMPANY V e ESXi | COMPANY R Enterprise Lx 5 |
| 605 | MODEL | COMPANY A SERVER MODEL1 | COMPANY A SERVER MODEL1 | COMPANY A BLADE SERVER MODEL2 | COMPANY A BLADE SERVER MODEL2 | COMPANY V VIRTUAL SERVER MODEL1 |
| 606 | CONFIGURATION | IA32 | IA32 | Chassis1 Slot1 SMP:No IA32 | Chassis2 Slot1 SMP:No IA32 | IA32 |
| 607 | OPERATION INFORMATION | IN OPERATION | IN OPERATION | IN OPERATION | IN OPERATION | IN OPERATION |
| 608 | PERFORMANCE INFORMATION | CPU:3GHz/core:4 memory:4GB HDD(SAS):120GB NIC:1Gbps HBA:3Gbps | CPU:3GHz/core:4 memory:4GB HDD(SAS):120GB NIC:1Gbps HBA:3Gbps | CPU:2GHz/core:2 memory:4GB NIC:1Gbps HBA:3Gbps | CPU:2GHz/core:8 memory:16GB NIC:10Gbps HBA:3Gbps | CPU:2GHz/core:1 memory:4GB HDD(SATA):80GB NIC:1Gbps HBA:3Gbps |
| 609 | INFORMATION ACQUIRED TIME | 2011/11/1 01:00:00 | 2011/11/1 01:05:00 | 2011/11/1 01:06:00 | 2011/11/1 01:08:00 | 2011/11/1 01:01:00 |
| 610 | ADDITIONAL SETTING ITEM | CONFIGURE CLUSTER 1 | CONFIGURE CLUSTER 1 | KEEPING BACKUP DATA OF VIRTUAL SERVER 1 | VIRTUAL SOFTWARE IS OPERATING | TRANSMIT BACKUP DATA TO SERVER 3. OPERATING ON HYPERVISOR OF SERVER 4 |
| 611 | RELATED GROUP | GROUP 1 | GROUP 1 | GROUP 2 | GROUP 3 | GROUP 2 GROUP 3 |
| 612 | REGISTRATION STATUS | REGISTERED | UNREGISTERED | REGISTERED | REGISTERED | REGISTERED |
| 613 | REGULAR ACQUISITION | ACQUIRED | ACQUIRED | ACQUIRED | ACQUIRED | ACQUIRED |

*Fig. 6A*

| NODE ID ~601 | MANAGEMENT IP ADDRESS ~602 | AUTHEN-TICATION INFOR-MATION ~603 | OS ~604 | MODEL ~605 | CON-FIGU-RATION ~606 | OPERATION INFORMATION ~607 | PERFORMANCE INFORMATION ~608 | INFORMA-TION ACQUIRED TIME ~609 | ADDITIONAL SETTING ITEM ~610 | RELATED GROUP ~611 | REGIST-RATION STATUS ~612 | REGULAR ACQUISITION ~613 |
|---|---|---|---|---|---|---|---|---|---|---|---|---|
| VIRTUAL SERVER 2 | 1.1.1.15 | hoge: Password 6 | COMPANY W Sv2008 | COMPANY VMware VIRTUAL SERVER MODEL2 | IA32 | SHUT DOWN | CPU:2GHz/core:2 memory:4GB HDD(SATA):80GB NIC:1Gbps, HBA:3Gbps | 2011/11/1 01:05:00 | OPERATING ON HYPERVISOR OF SERVER 4 | GROUP 3 | REGIS-TERED | ACQUIRED |
| NW-SW1 | 1.1.1.101 | root: Password 7 | - | COMPANY C IP NETWORK SWITCH MODEL1 | PORT COUNT : 16 | IN OPERA-TION | SWITCH CAPACITY :32Gbps | 2011/11/1 01:00:00 | | - | REGIS-TERED | ACQUIRED |
| NW-SW2 | 1.1.1.102 | root: Password 8 | - | COMPANY D IP NETWORK SWITCH MODEL1 | PORT COUNT : 16 | IN OPERA-TION | SWITCH CAPACITY :32Gbps | 2011/11/1 01:20:00 | | - | REGIS-TERED | UNAC-QUIRED |
| FC-SW1 | 1.1.1.103 | root: Password 9 | - | COMPANY E FC SWITCH MODEL1 | PORT COUNT : 16 | IN OPERA-TION | SWITCH CAPACITY :32Gbps | 2011/11/1 01:10:00 | | - | REGIS-TERED | AC-QUIRED |
| STORAGE 1 | 1.1.1.201 | root: Password 10 | - | COMPANY H STORAGE MODEL1 | - | IN OPERA-TION | STORAGE CAPACITY :100TB | 2011/11/1 01:11:00 | | - | REGIS-TERED | AC-QUIRED |
| STORAGE 2 | 1.1.1.202 | root: Password 10 | - | COMPANY H STORAGE MODEL2 | - | IN OPERA-TION | STORAGE CAPACITY :100TB | 2011/11/1 01:12:00 | | - | REGIS-TERED | AC-QUIRED |
| ... | ... | ... | ... | ... | ... | ... | ... | ... | ... | ... | ... | ... |

*Fig. 6B*

| TOPOLOGY ID 701 | MANAGEMENT SEGMENT ID 707 | RELATED NODE ID 702 | RELATED NODE ID 703 | RELATED NODE ID2 704 | RELATED NODE ID3 705 | RELATED NODE ID4 706 |
|---|---|---|---|---|---|---|
| TOPOLOGY1 | SEGMENT1 | NW-SW1 | SERVER1 | FC-SW1 | STORAGE APPARATUS1 | — |
| TOPOLOGY2 | SEGMENT1 | NW-SW1 | SERVER2 | FC-SW1 | STORAGE APPARATUS2 | — |
| TOPOLOGY3 | SEGMENT1 | NW-SW1 | VIRTUAL SERVER1 | SERVER4 | FC-SW1 | STORAGE APPARATUS1 |
| TOPOLOGY4 | SEGMENT1 | NW-SW1 | SERVER3 | FC-SW1 | STORAGE APPARATUS2 | — |
| TOPOLOGY5 | SEGMENT1 | NW-SW1 | VIRTUAL SERVER2 | SERVER4 | FC-SW1 | STORAGE APPARATUS2 |
| TOPOLOGY6 | SEGMENT1 | NW-SW1 | NW-SW2 | — | — | — |
| ... | ... | ... | ... | ... | ... | ... |

226 CONFIGURATION INFORMATION TOPOLOGY TABLE

*Fig. 7*

| POLICY ID (801) | POLICY (802) | PRIORITY LEVEL (SMALLER VALUE INDICATES HIGHER PRIORITY LEVEL) (803) | INFORMATION ACQUISITION IN CASE OF FAILURE (804) |
|---|---|---|---|
| POLICY1 | BACKUP SOURCE-DATA BACKUP DESTINATION RELATIONSHIP IS SET. | 2 | GIVEN PRIORITY |
| POLICY2 | LOAD BALANCING AMONG PLURALITY OF SERVERS IS SET. | 3 | — |
| POLICY3 | CLUSTER CONFIGURATION IS SET. | 4 | — |
| POLICY4 | HAVE VIRTUAL SERVER-HYPERVISOR RELATIONSHIP. OR ARE VIRTUAL SERVERS THAT OPERATE ON THE SAME HYPERVISOR. | 5 | — |
| ⋮ | ⋮ | ⋮ | ⋮ |

223 ACQUISITION GROUP POLICY TABLE

*Fig. 8*

| GROUP ID 901 | GROUP PRIORITY LEVEL 902 | INFORMATION ACQUISITION IN CASE OF FAILURE 908 | REGISTRATION STATUS 903 | RELATED NODE ID1 904 | RELATED NODE ID2 905 | RELATED NODE ID3 906 | RELATED NODE ID4 907 |
|---|---|---|---|---|---|---|---|
| GROUP1 | 4 | — | REGISTERED | SERVER1 | SERVER2 | — | — |
| GROUP2 | 2 | GIVEN PRIORITY | UNREGISTERED | SERVER3 | VIRTUAL SERVER1 | — | — |
| GROUP3 | 5 | — | UNREGISTERED | SERVER4 | VIRTUAL SERVER1 | VIRTUAL SERVER2 | — |
| ... | ... | ... | ... | ... | ... | ... | ... |

224 ACQUISITION GROUP TABLE

*Fig. 9*

| ACQUISITION NUMBER (1001) | MANAGEMENT SEGMENT ID (1002) | NODE ID (1003) |
|---|---|---|
| 1 | SEGMENT1 | NW-SW1 |
| 2 | SEGMENT1 | SERVER1 |
| 3 | SEGMENT1 | SERVER2 |
| 4 | SEGMENT1 | FC-SW1 |
| 5 | SEGMENT1 | STORAGE APPARATUS1 |
| 6 | SEGMENT1 | STORAGE APPARATUS2 |
| 7 | SEGMENT1 | VIRTUAL SERVER1 |
| 8 | SEGMENT1 | SERVER3 |
| 9 | SEGMENT1 | SERVER4 |
| 10 | SEGMENT1 | VIRTUAL SERVER2 |
| 11 | SEGMENT1 | NW-SW2 |

225 ACQUISITION ORDER TABLE

Fig. 10

| 1701 | 1702 | 1702 |
|---|---|---|
| GROUP ID | PRIORITY LEVEL | REGISTRATION STATUS |
| GROUP1 | 1 | REGISTERED |
| GROUP2 | 2 | UNREGISTERED |

227 TEMPORARY REGISTRATION TABLE

*Fig. 18*

| 1801 | 1802 | 1803 |
|---|---|---|
| ACQUISITION NUMBER | POLLING THREAD1 | POLLING THREAD2 |
| 1 | NW-SW1 | SERVER1 |
| 2 | SERVER2 | FC-SW1 |
| 3 | STORAGE APPARATUS1 | STORAGE APPARATUS2 |
| 4 | VIRTUAL SERVER1 | SERVER3 |
| 5 | SERVER4 | VIRTUAL SERVER2 |
| 6 | NW-SW2 | |

228 POLLING THREAD ASSIGNMENT TABLE

*Fig. 19*

| 2001 | 2002 | 2003 | 2004 |
|---|---|---|---|
| CONSTRAINT ID | CONSTRAINT SPECIFICS | ACQUISITION TIME | SUBJECT GROUP ID |
| 1 | PIECES OF INFORMATION OF MANAGEMENT SUBJECT APPARATUS IN THE SAME ACQUISITION GROUP ARE ACQUIRED WITHIN 1 HOUR | WITHIN 1 HOUR | GROUP1 |
| 2 | OPERATION MONITORING INTERVAL OF VIRTUAL MACHINES AND HYPERVISOR IS 10 MINUTES AT MAXIMUM | WITHIN 10 MINUTES | GROUP3 |

228 CONSTRAINT TABLE

*Fig. 22*

| 2801 | 2802 | 2803 | 2804 | 2805 | 2806 | 2807 | 2808 | 2809 | 2810 | 2811 |
|---|---|---|---|---|---|---|---|---|---|---|
| NODE ID | MANAGE-MENT IP ADDRESS | AUTHENTI-CATION INFORMA-TION | OS | MODEL | CONFIGU-RATION | OPERA-TION INFOR-MATION | PERFORMANCE INFORMATION | INFORMA-TION ACQUIRED TIME | ADDITIONAL SETTING ITEM | REGULAR ACQUISI-TION |
| SERVER 2 | 1.1.1.12 | Administrator: Password2 | COMPANY W Server 2008 | COMPANY A SERVER MODEL1 | IA32 | IN OPERA-TION | CPU:3GHz/core:4 memory:4GB HDD(SAS):120GB NIC:1Gbps, HBA:3Gbps | 2011/11/1 01:05:00 | CONFIGURE CLUSTER 1 | ACQUISI-TION |
| SERVER 4 | 1.1.1.11 | root: Password4 | COMPANY V ESXi | COMPANY A BLADE SERVER MODEL2 | Chassis2 Slot1 SMP:No IA32 | IN OPERA-TION | CPU:2GHz/core:8 memory:16GB NIC:10Gbps, HBA:3Gbps | 2011/11/1 01:08:00 | VIRTUAL SOFTWARE IS OPERATING | ACQUISI-TION |
| VIRTUAL SERVER 1 | 1.1.1.14 | root: Password5 | COMPANY R Enterprise L5 | COMPANY V VIRTUAL SERVER MODEL1 | IA32 | IN OPERA-TION | CPU:2GHz/core:1 memory:4GB HDD(SATA):80GB NIC:1Gbps, HBA:3Gbps | 2011/11/1 01:01:00 | TRANSMIT BACKUP DATA TO SERVER 3. OPERATING ON HYPERVISOR OF SERVER 4 | ACQUISI-TION |
| ... | ... | ... | ... | ... | ... | ... | ... | ... | ... | ... |

*Fig. 31A*

| NODE ID 2801 | MANAGE-MENT IP ADDRESS 2802 | AUTHENTI-CATION INFORMA-TION 2803 | OS 2804 | MODEL 2805 | CONFIGU-RATION 2806 | OPERATION INFOR-MATION 2807 | PERFORMANCE INFORMATION 2808 | INFORMA-TION ACQUIRED TIME 2809 | ADDITIONAL SETTING ITEM 2810 | REGULAR ACQUISITION 2811 |
|---|---|---|---|---|---|---|---|---|---|---|
| NW-SW1 | 1.1.1.101 | root: Password7 | - | COMPANY C IP NETWORK SWITCH MODEL1 | PORT COUNT: 16 | IN OPERATION | SWITCH CAPACITY: 32Gbps | 2011/11/1 01:00:00 | | ACQUIRED |
| NW-SW2 | 1.1.1.102 | root: Password8 | - | COMPANY D IP NETWORK SWITCH MODEL1 | PORT COUNT: 16 | IN OPERATION | SWITCH CAPACITY: 32Gbps | 2011/11/1 01:20:00 | | UNACQUIRED |
| STORAGE1 | 1.1.1.201 | root: Password10 | - | COMPANY H STORAGE MODEL1 | - | IN OPERATION | STORAGE CAPACITY: 100TB | 2011/11/1 01:11:00 | | ACQUIRED |
| ... | ... | ... | ... | ... | ... | ... | ... | ... | ... | ... |

*Fig. 31B*

| ACQUISITION NUMBER 2901 | POLLING THREAD1 2902 |
| --- | --- |
| 1 | NW-SW1 |
| 2 | SERVER2 |
| 3 | STORAGE APPARATUS1 |
| 4 | VIRTUAL SERVER1 |
| 5 | SERVER4 |
| 6 | NW-SW2 |

2503 ACQUISITION ORDER TABLE

*Fig. 32*

INFORMATION ACQUISITION METHOD, COMPUTER SYSTEM, AND MANAGEMENT COMPUTER

BACKGROUND

This invention relates to a technology with which information of an IT apparatus group that is a management subject is acquired in a concentrated manner in units in which an administrator of a datacenter or other infrastructures, or a host management product, uses information, to thereby reduce the gap between a time when a piece of management subject information is acquired and a time when another piece of management subject information is acquired within the unit.

Currently, there is such a trend in a market that resources of all IT apparatus in a datacenter are managed by using a product for managing the IT apparatus in a unified manner. Moreover, as a result of a prevailing server virtualization technology, the number of the IT apparatus and servers including virtual servers subject to the management tends to increase. In the related-art datacenter operation, a management server regularly acquires all pieces of information of IT apparatus that are management subjects in an order registered in advance (in the order of their IP addresses or the like). An administrator refers to information held in the management server as the need arises (for example, WO 2009/144969 A2).

SUMMARY

The related-art regular information acquisition method described above, however, does not take into account units in which information is used by the administrator or an application that cooperates with the management server (e.g., a configuration information management application). Accordingly, there is a chance that the infrastructure administrator or the integrated management product uses pieces of information that fluctuate significantly in freshness together. In the worst case, a piece of information that is acquired first in an order registered in advance and a piece of information that is acquired last in the registered order are used together. This requires determining whether the information that has been acquired first has not changed at the time the acquired pieces of information are used together. In other words, this gives rise to a problem in that, when the infrastructure administrator or the like acquires information to deal with a failure that has occurred, subjects whose information is to be acquired and the order in which the information is acquired cannot be changed at the time the information collection is started.

It is therefore an object of this invention to quickly acquire information of an IT apparatus group that is a management subject in groups of IT apparatus used by an administrator of an infrastructure or by an application that cooperates with a management server.

A representative aspect of the present disclosure is as follows. An information acquisition method for acquiring, by a management computer comprising a processor, a memory, and an interface, via a network for coupling the management computer to a plurality of computers, information of the computers, the information acquisition method comprising: a first step of setting, by the management computer, in acquisition group information, groups of computers whose information is to be acquired out of the plurality of computers; a second step of determining, by the management computer, for each group, an order in which information of the computers in the each group is acquired after determining an order of acquiring information on a group-by-group basis; a third step of outputting, by the management computer, a command to acquire information of the computers in the determined order; and a fourth step of acquiring, by an information acquisition executing part, based on the information acquisition command, information of the computers on a group-by-group basis in the determined order.

According to one embodiment of the present invention, information of management subject apparatus can be acquired in a concentrated manner on a group-by-group basis in groups of apparatus that comprise a computer system used by an administrator or by an application that cooperates with a management computer, and the time required to acquire information of management subjects in the group in question is consequently kept short.

BRIEF DESCRIPTION OF THE DRAWINGS

FIG. 6A shows a managed apparatus registration table of the first half which is stored on the management server according to the first embodiment of this invention.

FIG. 6B shows the managed apparatus registration table of the last half which is stored on the management server according to the first embodiment of this invention.

FIG. 7 shows the configuration information topology table which is stored on the management server according to the first embodiment of this invention.

FIG. 8 shows the acquisition group policy table which is stored on the management server according to the first embodiment of this invention.

FIG. 9 shows the acquisition group table which is stored on the management server according to the first embodiment of this invention.

FIG. 10 shows the acquisition order table which is generated by the management server according to the first embodiment of this invention.

FIG. 18 shows the temporary registration table which is stored on the management server according to the first embodiment of this invention.

FIG. 19 shows the polling thread assignment table according to the first embodiment of this invention.

FIG. 22 shows the constraint table which is stored on the management server according to the second embodiment of this invention.

FIG. 31A shows an example of the temporary managed apparatus registration table of the first half according to the fourth embodiment of this invention.

FIG. 31B shows an example of the temporary managed apparatus registration table of the last half according to the fourth embodiment of this invention.

FIG. 32 shows an example of the acquisition order table according to the fourth embodiment of this invention.

DETAILED DESCRIPTION OF THE PREFERRED EMBODIMENTS

Embodiments of this invention are described below with reference to the accompanying drawings.

First Embodiment

Figure 1:
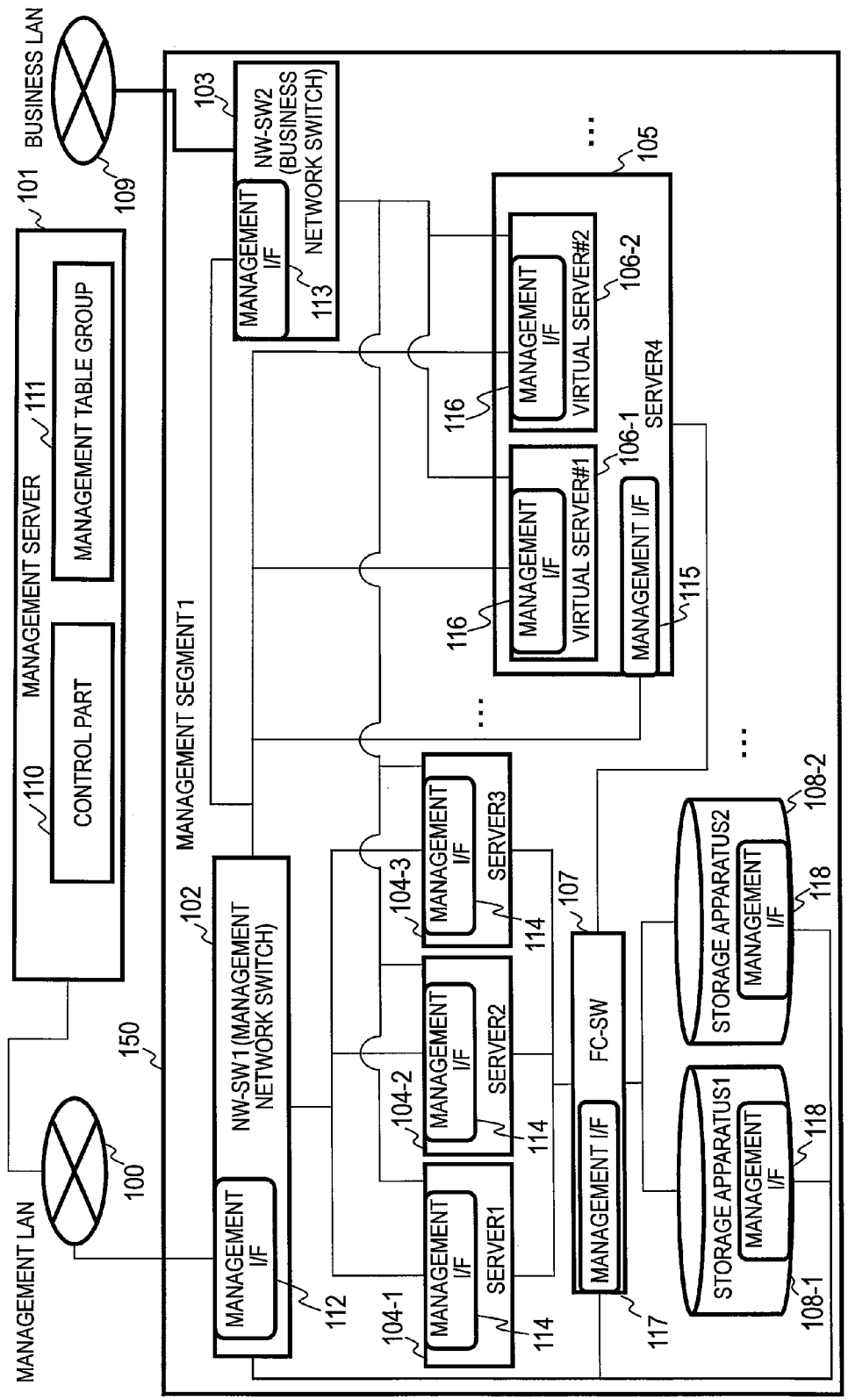
FIG. 1 is a block diagram illustrating an example of a computer system according to a first embodiment of this invention.

FIG. 1 is a block diagram illustrating an example of a computer system according to a first embodiment of this invention. A management server 101 is coupled, via a management LAN 100 and a management network switch (NW-SW) 102, to a management interface (management I/F) 112 of the NW-SW 102, a management interface 113 of a business network switch (NW-SW) 103, a management interface 117 of a fibre channel (FC)-SW 107, management interfaces 114 of servers 104-1 to 104-3, a management interface 115 of a server 105, management interfaces 116 of virtual servers 106-1 and 106-2, and management interfaces 118 of storage apparatus 108-1 and 108-2. The management interfaces 112 to 118 are interfaces (or I/O interfaces) for transmitting information of the respective IT apparatus (hereinafter simply referred to as apparatus) in response to an inquiry from the management server 101. For example, network interfaces described later can be employed as the management interfaces 112 to 118.

The management LAN 100 and the NW-SW 102 comprise a network over which the management server 101 manages the plurality of servers 104-1 to 104-3. In the following description, the servers 104-1 to 104-3 are collectively referred to as servers 104 and the virtual servers 106-1 and 106-2 are collectively referred to as virtual servers 106.

The management server 101 handles operation management such as the distribution of an OS and applications to operate on the respective servers 104 and power supply control. The NW-SW 103 is a constituent of a business network which is used by business applications executed on the servers 104. The NW-SW 103 is coupled via a business LAN 109 to a WAN or the like to hold communication to and from a client computer outside the computer system.

On the management server 101, a control part 110 is executed, and the control part 110 refers to and updates a management table group 111. The management table group 111 is updated or set by the control part 110 as described later.

A management segment 150 is an area managed by the management server 101. The definition of the management segment 150 can be set at an administrator's discretion. For instance, an IP address network segment may be defined so that "1.1.1.X" (X represents an arbitrary number) is Segment One whereas "1.1.2.Y" (Y represents an arbitrary number) is Segment Two. The management segment 150 may also be defined with a particular apparatus as a reference, such as the NW-SW 102 of this embodiment Though not shown in the drawing, the computer system may have a plurality of management segments.

Figure 2:
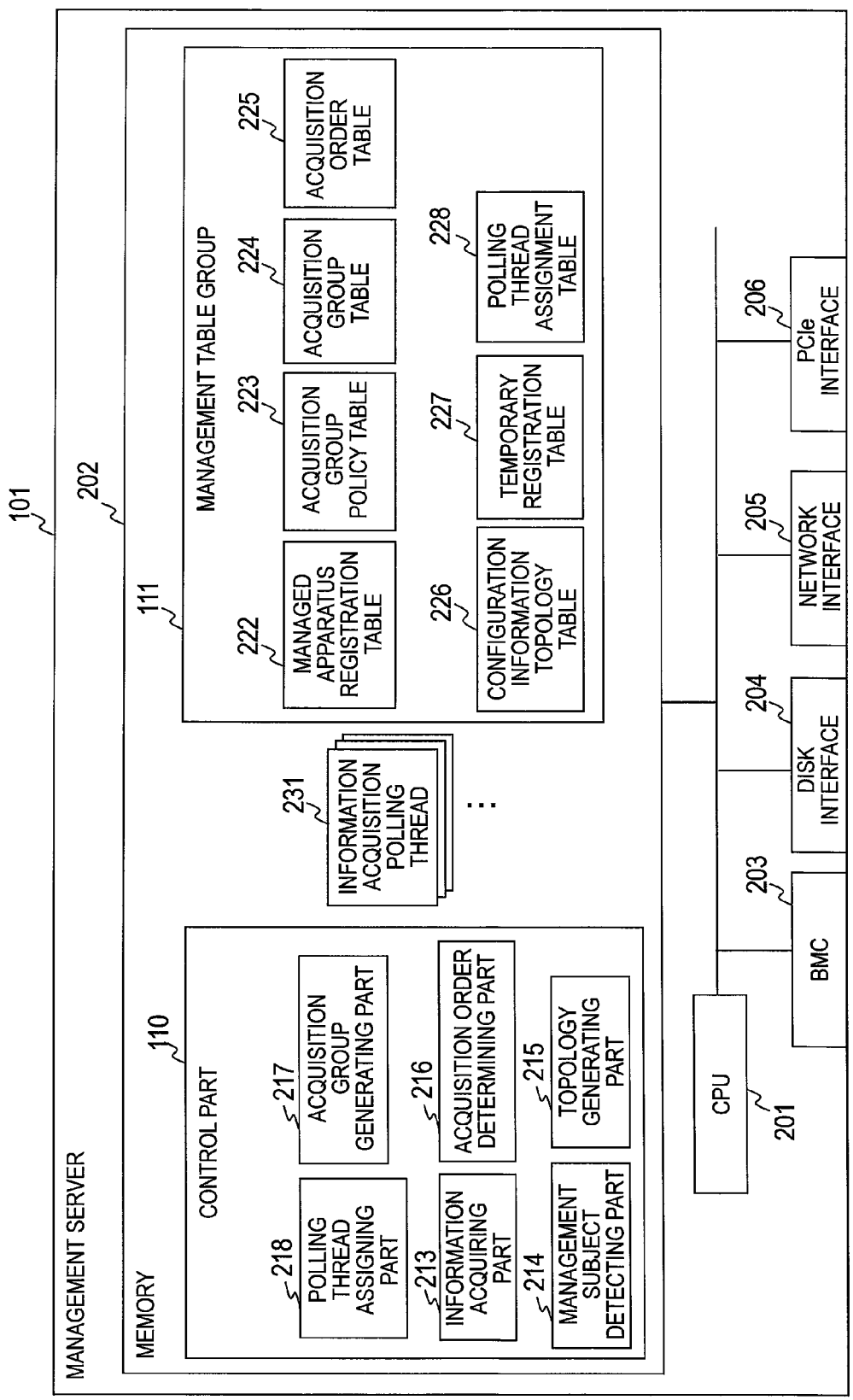
FIG. 2 is a block diagram illustrating the configuration of the management server according to the first embodiment of this invention.

FIG. 2 is a block diagram illustrating the configuration of the management server 101. The management server 101 includes a central processing unit (CPU) 201 for carrying out calculation, a memory 202 for storing programs executed by the CPU 201 and data generated in the course of executing a program, a disk interface 204 for making access to the storage apparatus 108 for storing programs and data and the like, a network interface 205 for communication via an IP network and a PCI-Express interface 206 to which I/O devices compliant with the PCI Express (I/O interface) standard (I/O adaptors such as network interface cards (NICs), host bus adapters (HBAs), and converged network adapters (CNAs) or I/O devices) can be coupled.

In the management server 101 of FIG. 2, representative one is illustrated for each of the network interface 205 and the disk interface 204, but a plurality thereof may exist. For example, for the respective couplings to the management network 102 and the business network 103, network interfaces 205 different from each other may be used.

Figure 13:
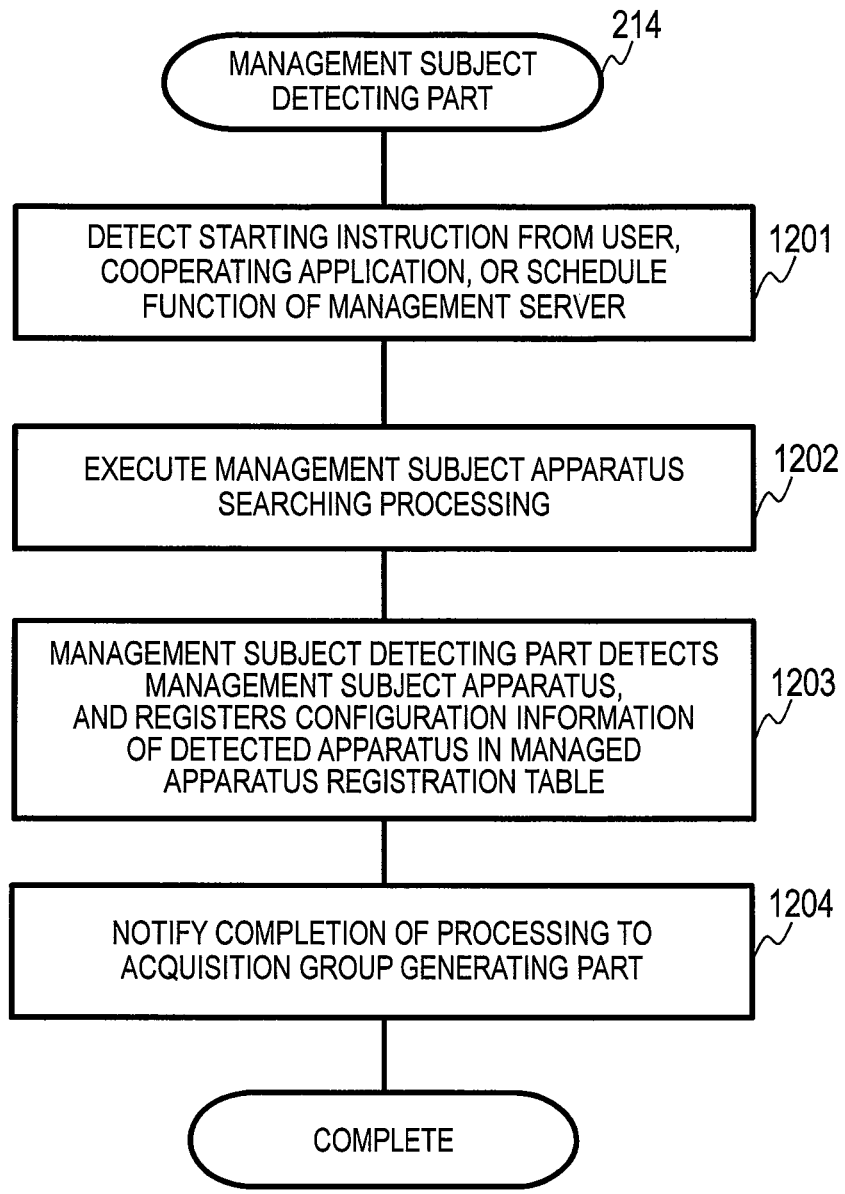
FIG. 13 is a flow chart illustrating an example of processing that is executed in the management subject detecting part according to the first embodiment of this invention.
Figure 14:
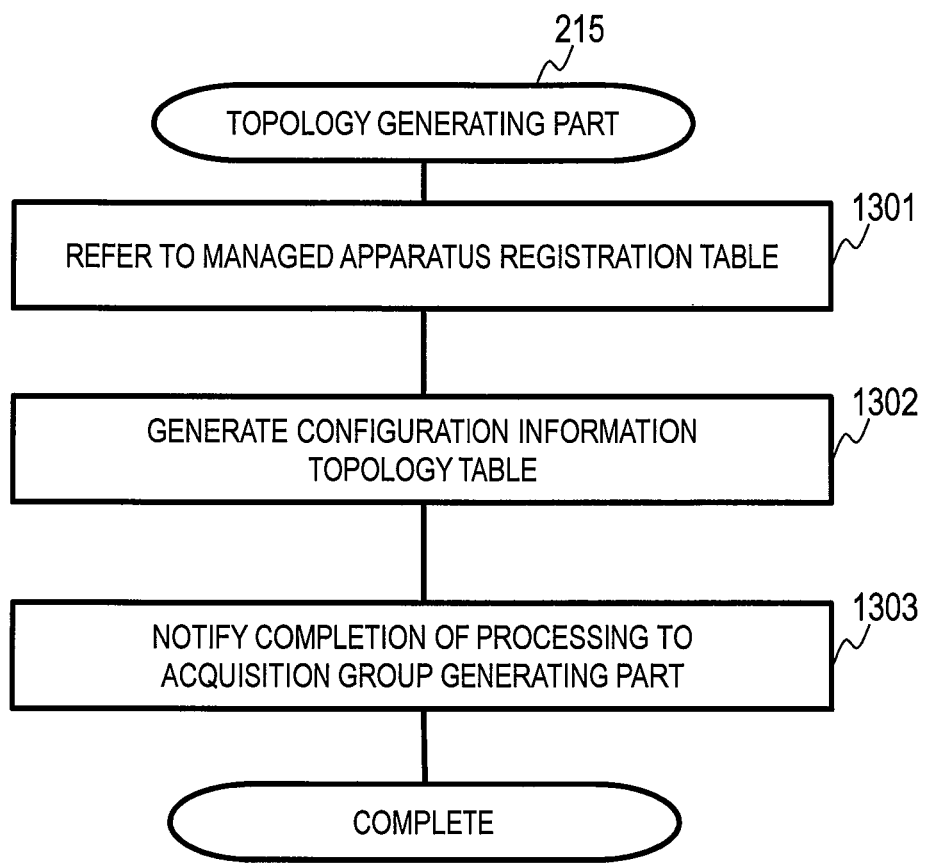
FIG. 14 is a flow chart illustrating an example of processing that is executed by the topology generating part according to the first embodiment of this invention.
Figure 15A:
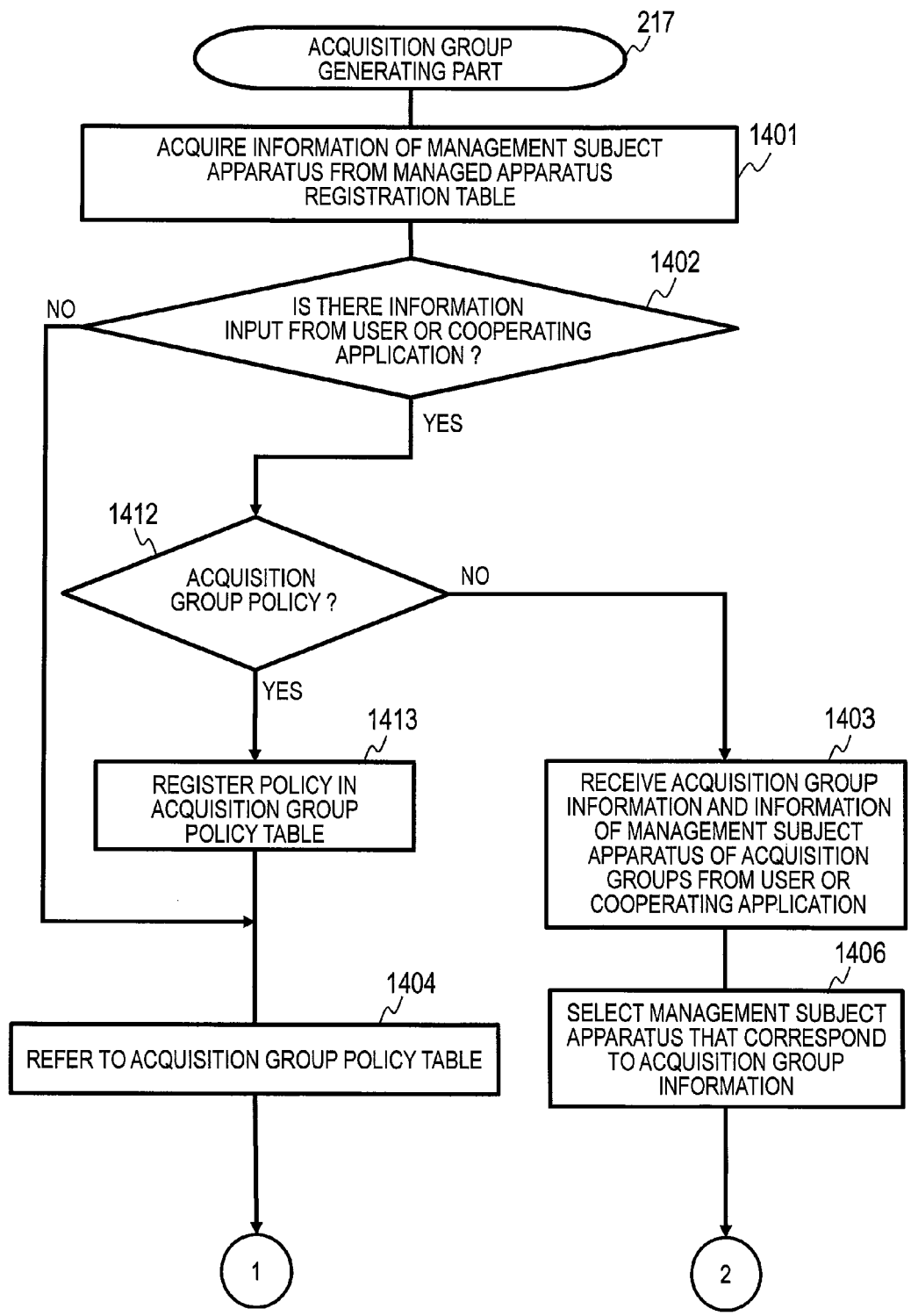
FIG. 15A is a flow chart illustrating an example of processing of the first half that is executed by the acquisition group generating part according to the first embodiment of this invention.
Figure 15B:
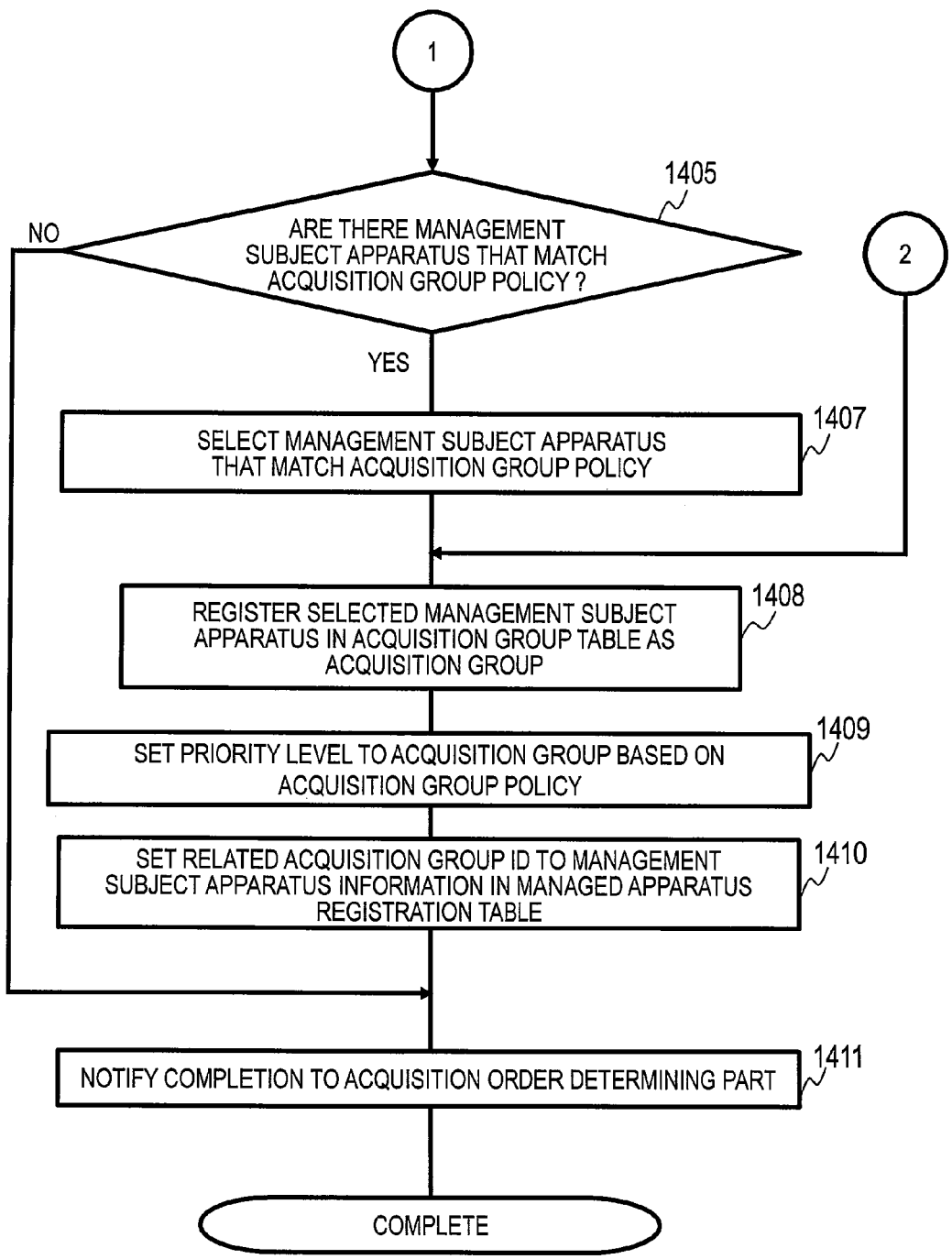
FIG. 15B is a flow chart illustrating an example of processing of the last half that is executed by the acquisition group generating part according to the first embodiment of this invention.
Figure 16A:
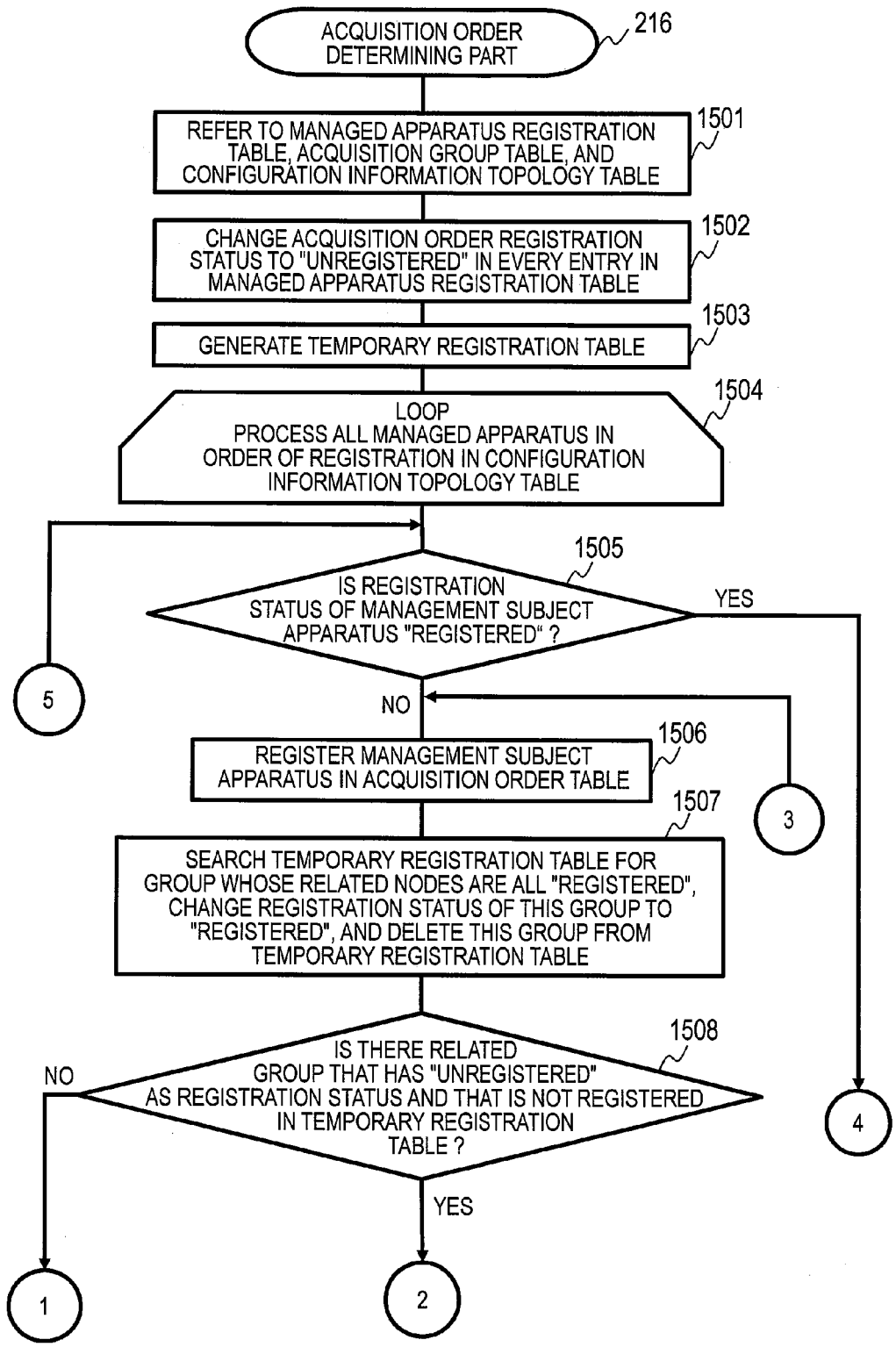
FIG. 16A is a flow chart illustrating an example of processing of the first half that is executed by the acquisition order determining part according to the first embodiment of this invention.
Figure 16B:
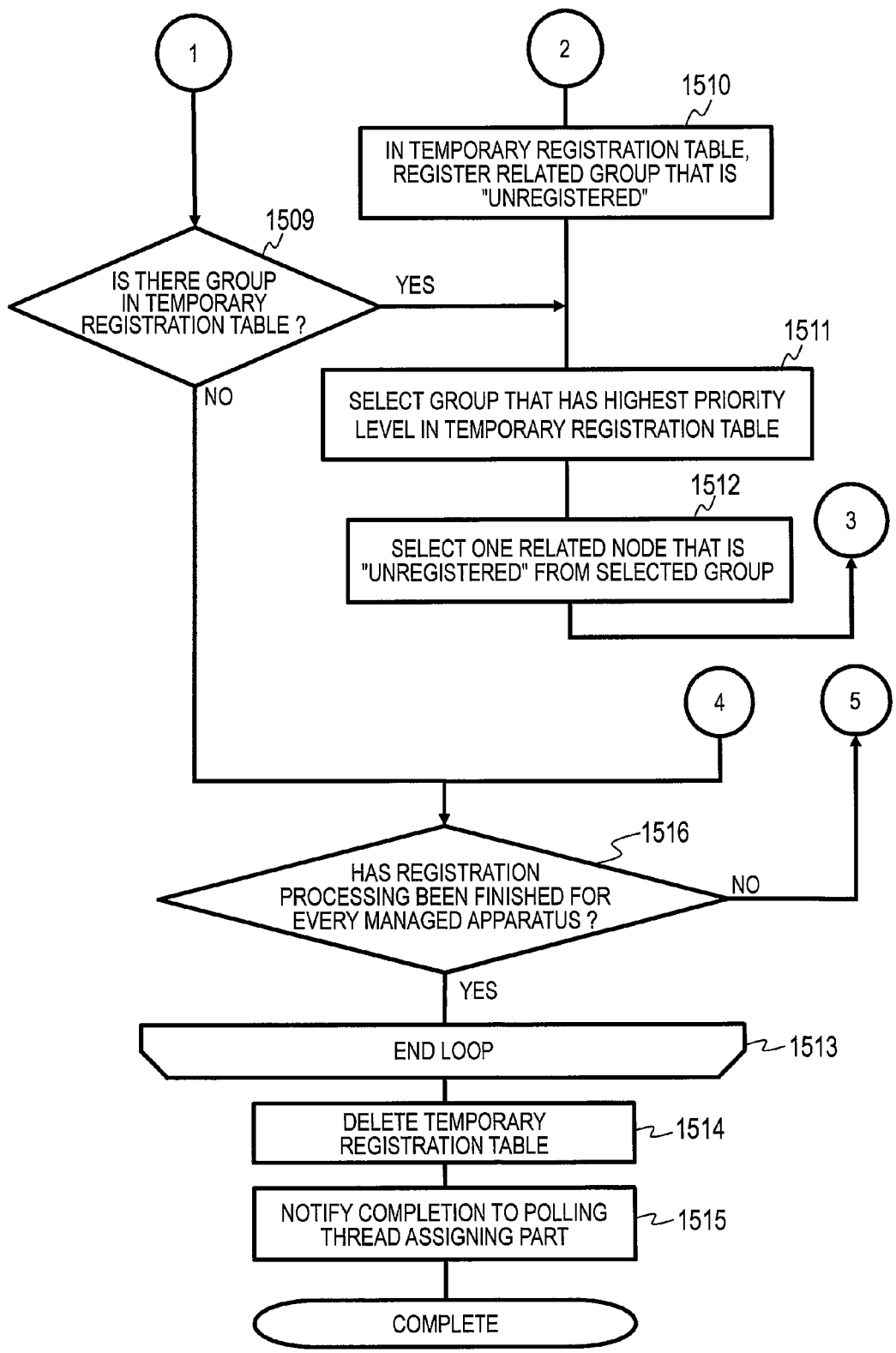
FIG. 16B is a flow chart illustrating an example of processing of the last half that is executed by the acquisition order determining part according to the first embodiment of this invention.
Figure 17:
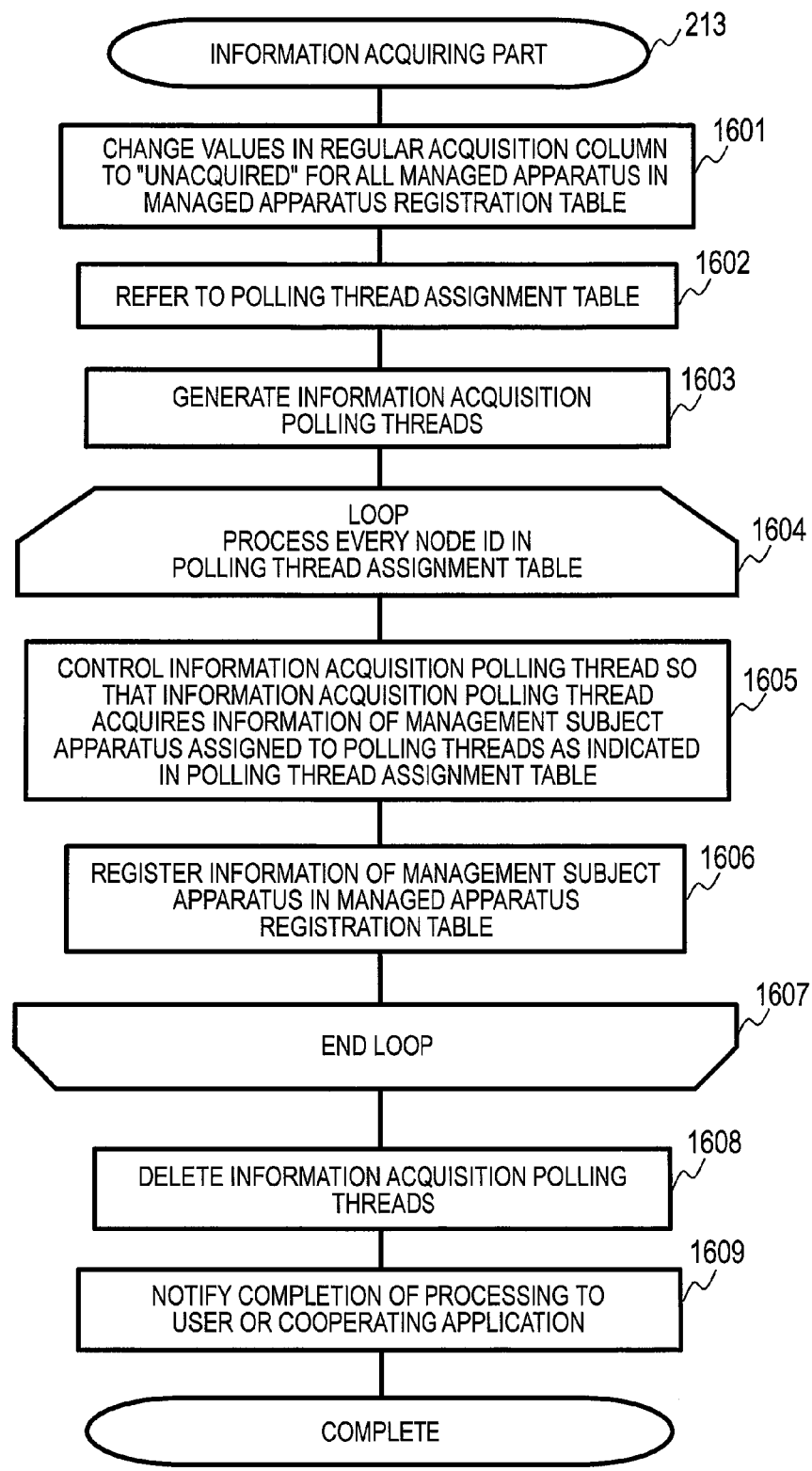
FIG. 17 is a flow chart illustrating an example of processing that is executed by the information acquiring part according to the first embodiment of this invention.
Figure 20:
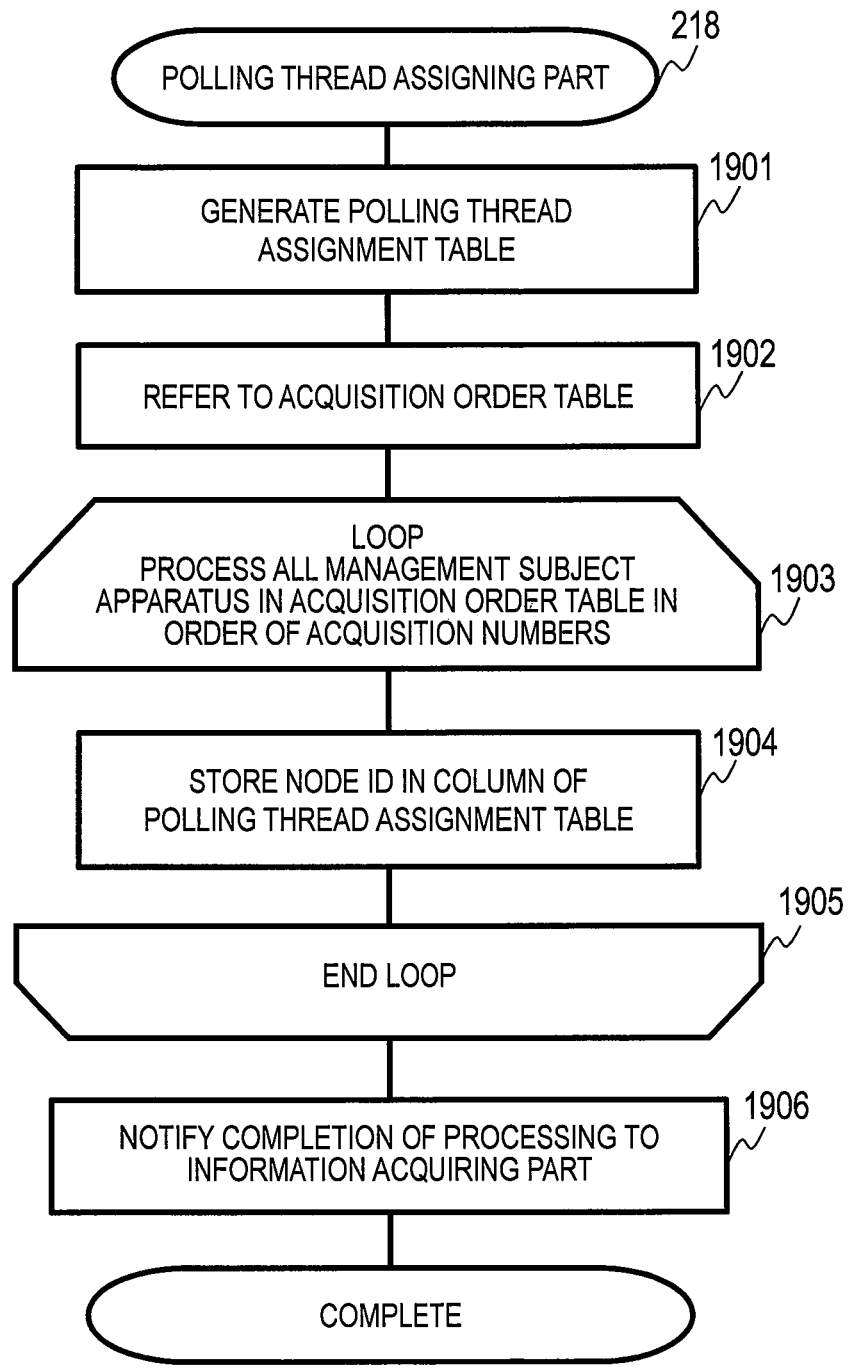
FIG. 20 is a flow chart illustrating an example of processing that is executed by the polling thread assigning part according to the first embodiment of this invention.

In the memory 202, the control part 110, the management table group 111, and information acquisition polling threads (information acquisition executing part) 231 are stored. The control part 110 includes a management subject detecting part 214, which is illustrated in FIG. 13, a topology generating part 215, which is illustrated in FIG. 14, an acquisition group generating part 217, which is illustrated in FIGS. 15A and 15B, an acquisition order determining part 216, which is illustrated in FIGS. 16A and 16B, an information acquiring part 213, which is illustrated in FIG. 17, and a polling thread assigning part 218, which is illustrated in FIG. 20.

The management subject detecting part 214, the topology generating part 215, the acquisition group generating part 217, the acquisition order determining part 216, the information acquiring part 213, and the polling thread assigning part 218 which are functional parts are loaded as programs onto the memory 202. The information acquisition polling threads 231 may be generated at the time when the control part 110 is loaded, or when information is acquired.

The CPU 201 operates as programmed by the program of each of the functional parts, thereby operating as the functional part for realizing a predetermined function. For example, the CPU 201 operates as programmed by an acquisition group generating program to function as the acquisition group generating part 217. The same holds true for the other programs. The CPU 201 also operates as functional parts for realizing a plurality of respective pieces of processing carried out by the respective programs. The computer and the computer system are an apparatus and a system including those functional parts.

The management table group 111 includes a managed apparatus registration table 222, which is shown in FIGS. 6A and 6B, a configuration information topology table 226, which is shown in FIG. 7, an acquisition group policy table 223, which is shown in FIG. 8, an acquisition group table 224, which is shown in FIG. 9, an acquisition order table 225, which is shown in FIG. 10, a temporary registration table 227, which is shown in FIG. 18, and a polling thread assignment table 228, which is shown in FIG. 19.

Information of the respective tables may be generated automatically by programs (function portions) in the management server 101, or may be input manually by a user (or a management terminal), or may be input by an application that cooperates with the management server 101. An example of applications that cooperate with the management server 101 is an integrated management application.

The types of the management server 101, the servers 104, and the servers 105 may be any of a physical server, a blade server, a virtualized server, and a server partitioned logically or physically, and effects of this invention can be provided by using any one of those servers.

Information such as programs and tables for realizing each of the functions of the control part 110 can be stored in memory devices such as the storage apparatus 108, a non-volatile semiconductor memory, a hard disk drive, and a solid state drive (SSD), or in a computer-readable non-transitory data storage medium such as an IC card, an SD card, and a DVD.

Figure 3:
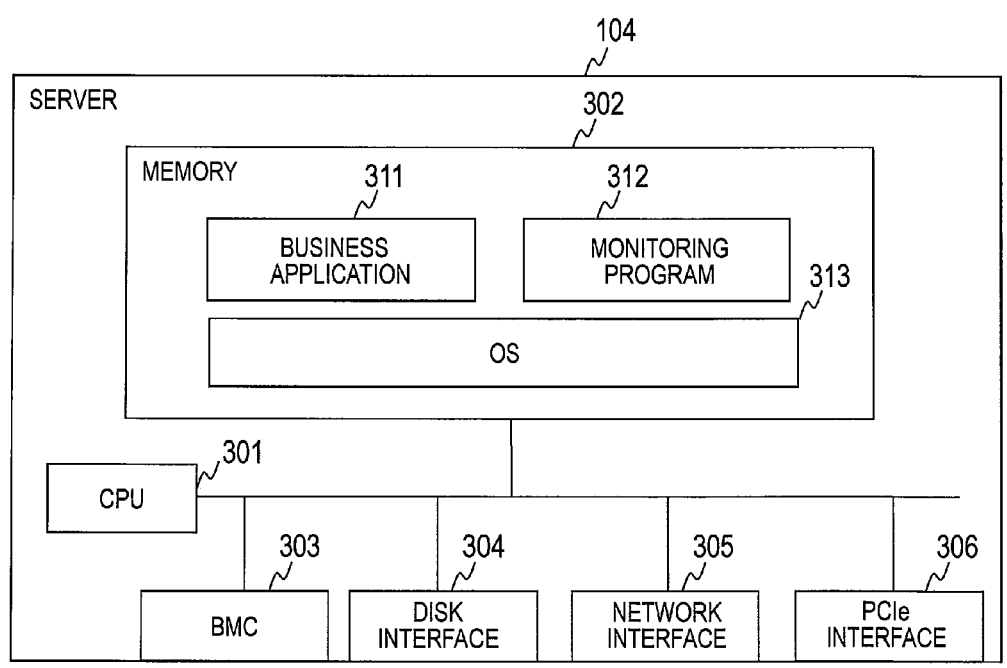
FIG. 3 is a block diagram illustrating the configuration of each server according to the first embodiment of this invention.

FIG. 3 is a block diagram illustrating the configuration of each server 104. The server 104 includes a CPU 301 for carrying out calculation, a memory 302 for storing programs executed by the CPU 301 and data generated in the course of executing a program, a disk interface 304 for making access to the storage apparatus (or storage subsystem) 108 for storing the programs and the data, a network interface 305 for communication performed via the IP network, a basement management controller (BMC) 303 for carrying out the power supply control, and controlling the respective interfaces, and a PCI-Express interface 306. An OS 313 on the memory 302 is executed by the CPU 301, thereby carrying out device management in the server 102. Under the OS 313, an application 311 for providing a business service, a monitoring program 312, and the like are executed.

In FIG. 3, representative one is illustrated for each of the network interface 305 and the disk interface 304, but a plurality thereof may exist. For example, for the respective couplings to the management network 102 and the business network 103, network interfaces 305 different from each other are used. In this embodiment, the server 104 includes the network interface 305 for coupling to the management network (NW-SW 102) and the business network (NW-SW 103). The management I/F 114, which is illustrated in FIG. 1, is the network interface 305 for the management network (NW-SW 102) in FIG. 3.

Figure 4:
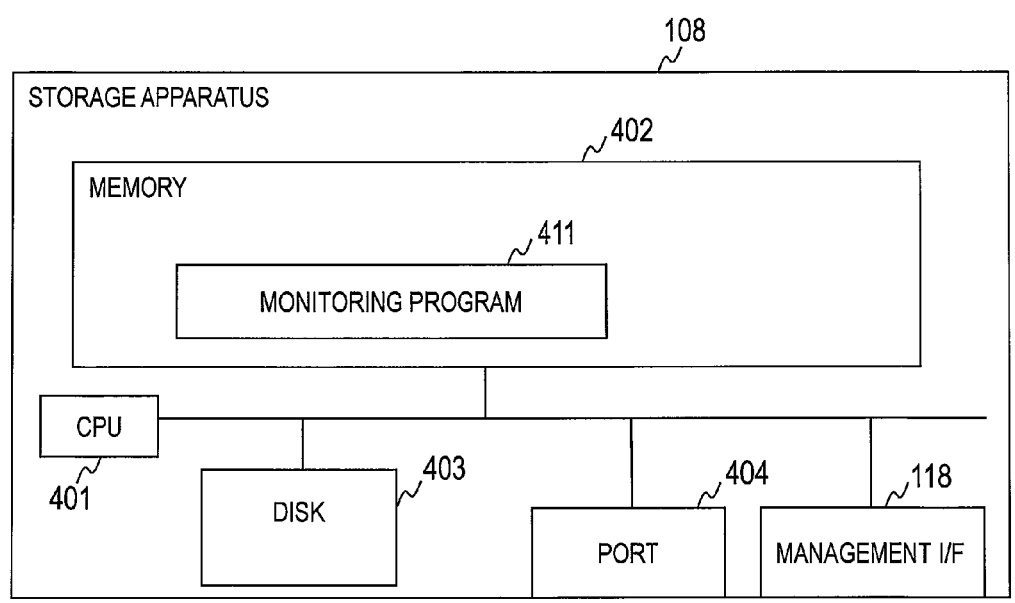
FIG. 4 is a block diagram illustrating the configuration of each storage apparatus according to the first embodiment of this invention.

FIG. 4 is a block diagram illustrating the configuration of each storage apparatus 108. The storage apparatus 108 includes a CPU 401 for carrying out calculation, a memory 402 for storing programs executed by the CPU 401 and data generated in the course of executing a program, a disk 403 for storing programs and data that are sent from the storage apparatus 108 and apparatus coupled to the storage apparatus 108, a port 404 for allowing the servers 104 and others to couple to the storage apparatus 108, and the management I/F 118 which is used by the management server 101 to manage the storage apparatus 108. A network interface can be employed as the management I/F 118.

Figure 5:
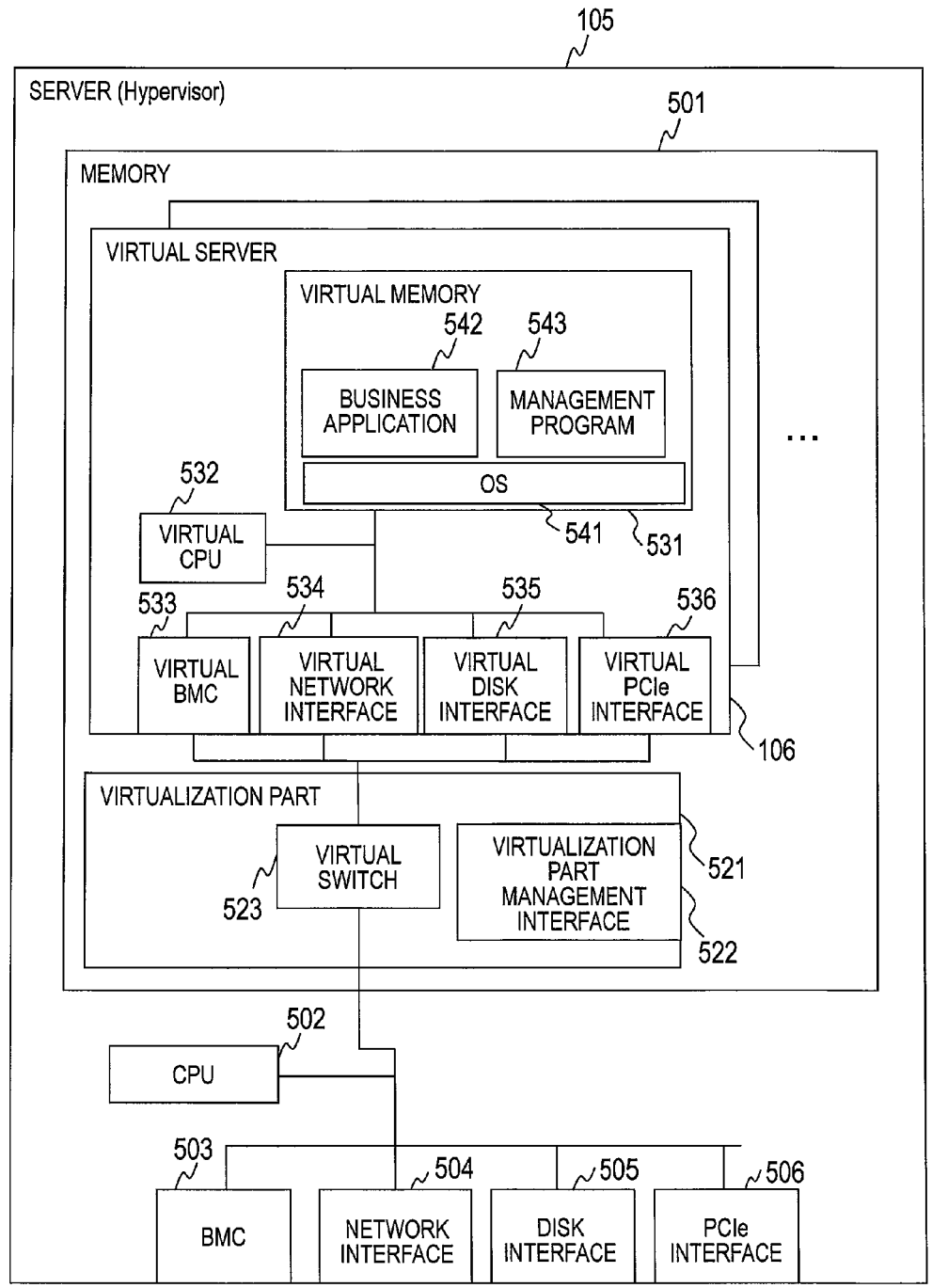
FIG. 5 is a block diagram of the server for executing a virtualization part to provide the plurality of virtual servers according to the first embodiment of this invention.

FIG. 5 is a block diagram of the server 105 for executing a virtualization part 521 to provide the plurality of virtual servers 106. The server 105 includes, similarly to the servers 104, a CPU 502, a memory 501, a BMC 503, a network interface 504, a disk interface 505, and a PCIe interface 506.

The server 105, however, has the virtualization part 521 and the virtual servers 106-1 and 106-2 in the memory 501. The server 105 uses the virtualization part 521 to virtualize computer resources of the server 105, and provides at least one virtual server 106. The virtualization part 521 is comprised from, for example, a hypervisor or a virtual machine monitor (VMM).

The memory 501 stores the virtualization part 521 described above for virtualizing computer resources, and the server 105 provides at least one virtual server 106. The virtualization part 521 has a virtualization part management interface 522 as a control-use interface. The virtualization part 521 comprises the virtual servers 106 by virtualizing computer resources of the server 105 (which may be a blade server). Each virtual server 106 includes a virtual CPU 532, a virtual memory 531, a virtual network interface 534, a virtual disk interface 535, and a virtual PCIe interface 536. The virtual memory 531 stores an OS 541 to manage a group of virtual devices in the virtual server 106. A business application 542 is executed on the OS 541. A management program 543 which operates on the OS 541 provides failure detection, OS power supply control, inventory management, and the like.

The virtualization part 521 manages the association between physical computer resources and virtual computer resources of the server 105. The virtualization part 521 has a virtual switch 523 in order to hold communication between a plurality of virtual servers 106. The virtual switch 523 allows a physical interface of the server 105 to couple to a plurality of virtual servers 106. The virtual servers 106 can thus couple to apparatus outside the server 105 via the interface of the server 105.

The virtualization part management interface 522 is an interface that allows the virtualization part 521 to hold communication to and from the management server 101, and is used when the virtualization part 521 notifies information to the management server 101 and when the management server 101 sends an instruction to the virtualization part 521. The virtualization part management interface 522 can also be used directly from a user terminal (not shown) or the like.

FIGS. 6A and 6B show the managed apparatus registration table 222 which is stored on the management server 101. The managed apparatus registration table 222 stores, among others, information of a group indicating the range of apparatus whose information, including configuration information that is held by apparatus managed by the management server 101 and information about software operating on the apparatus and about authentication, is to be acquired in a mass. In this embodiment, apparatus of different types, such as the servers 104, the server 105, and other various servers, the NW-SW 102 and other network switches, the FC-SW 107 and other FC switches, and the storage apparatus 108 and other storage apparatus, are registered in the same managed apparatus registration table 222. Alternatively, one managed apparatus registration table 222 may be provided for each apparatus type.

In FIGS. 6A and 6B, a column 601 stores the node IDs of the servers 104 and other apparatus managed by the management server 101. Each apparatus is identified uniquely by its node identifier. Inputting data to be stored in the column 601 can be omitted by specifying one of columns that are used in the table 222, or a combination of a plurality of columns of the table 222. The node IDs may be assigned automatically by the management server 101 in ascending order or other orders.

A column 602 stores management IP addresses assigned to the servers 104 and other management subject apparatus. The management server 101 couples to the servers 104 and other management subject apparatus based on the management IP addresses.

A column 603 stores user names and passwords that the management server 101 uses when coupling to the servers 104 and other management subject apparatus. A separator ":" separates a user name in the front from a password in the back in FIGS. 6A and 6B.

A column 604 stores information of OSes of the servers 104 and other management subject apparatus.

A column 605 stores model names of the servers 104 and other management subject apparatus. The model name is information on an infrastructure, and is information providing knowledge on makers, performances, and system limits that can be configured of the servers 104 and other management subject apparatus. Further, the model is information providing knowledge on whether or not the configuration is the same as that of another server and other management subject apparatus.

A column 606 stores the configurations of the servers 104 and other management subject apparatus. As information on the configurations, in the case of the servers 104, the servers 105, and other servers, the column 606 stores architectures of processors, physical location information on a chassis and slots, and characteristic functions (presence/absence of symmetric multi-processing (SMP) between blades, a high availability (HA) configuration, and the like). In the case of the NW-SW 102, the NW-SW 103, the FC-SW 107, and other switches, the column 606 stores a port count and the like.

A column 607 stores operation information of the servers 104 and other management subject apparatus. The operation information is information that indicates whether the power is on or off in a management subject apparatus and whether an OS or a business system is operating normally. In the case where communication between the management server 101 and a management subject apparatus is rendered impossible, a value indicating the fact is registered as the operation information.

A column 608 stores performance information on the servers 104 and other management subject apparatus. As the performance information, in the case of the servers 104, the servers 105, and other servers, the column 608 can store an operation frequency and the number of cores of a processor, a capacity of a memory, the capacity and a type of the assigned storage apparatus 108, performances of I/O devices, and the like. In the case of the NW-SW 102, the NW-SW 103, the FC-SW 107, and other switches, the column 608 can store switch capacities and the like. In the case of the storage apparatus 108 and other storage apparatus, the column 608 can store information such as overall storage capacities.

A column 609 stores times at which information of the servers 104 and other management subject apparatus has been acquired, or time stamps thereof.

A column 610 stores additional setting items that are respectively set to the servers 104 and other management subject apparatus. The additional setting items include the cluster configuration, the backup configuration, the load balancing configuration, information about the relationship between a hypervisor and a virtual machine, and the like. The column 610 may store an input from the user (administrator), information about a management subject apparatus that is acquired from an application cooperating with the management server 101, or information that is generated by the management server 101 based on the input or acquired information.

The column 611 stores, for each of the servers 104 and other management subject apparatus, a group related to the management subject apparatus. A group here is a set of management subject apparatus whose information is to be acquired within a given period of time, and corresponds to an acquisition group generated by the acquisition group generating part 217, which is described later with reference to FIGS. 15A and 15B. For each of the servers 104 and other management subject apparatus that has an acquisition group in which the management subject apparatus is included, the group ID of the acquisition group, which is shown in FIG. 9, is stored as the related group.

A column 612 stores information about whether or not an acquisition order has been registered (registration status). The registration status indicates whether the management server 101 has registered the servers 104 and other management subject apparatus in the acquisition order table, which is described later with reference to FIG. 10.

A column 613 stores, for each node, information indicating whether or not information acquiring processing has been executed for the node in a single session of the information acquiring processing performed on all management subjects.

FIG. 7 shows the configuration information topology table 226 which is stored on the management server 101. The configuration information topology table 226 stores information related to the coupling relationship between apparatus that are management subjects of the management server 101. Every apparatus that is a management subject of the management server 101 is registered in the configuration information topology table 226.

A column 701 stores topology IDs. A topology ID is an identifier for uniquely identifying one topology set. Inputting data to be stored in the column 701 can be omitted by specifying one of columns that are used in the table, or a combination of a plurality of columns of the table. The topology IDs may be assigned automatically by the management server 101 in ascending order or other orders.

A column 707 stores the management segment IDs of management segments in which topologies are present.

A column 702 stores network switches that are the start points of topologies. In this embodiment, a topology is registered with the network switch 102 or 103 as the start point. The start point of a topology may instead be a server such as one of the servers 104 or the server 105, an FC switch such as the FC switch 107, or a storage apparatus such as the storage apparatus 108.

A column 703, a column 704, a column 705, and a column 706 store related node IDs. A related node ID in an entry is the node ID, which is shown in FIGS. 6A and 6B, of an apparatus that is a constituent of a topology set to which a topology ID in the entry is assigned. A related node whose ID is in one column that is to the left or right of another column has a coupling relationship with a related node whose ID is in the other column. While only four columns that store related node IDs, the columns 703, 704, 705, and 706, are described in this embodiment, the count of related node ID columns varies depending on how many management subject apparatus comprise a topology set.

FIG. 8 shows the acquisition group policy table 223 which is stored on the management server 101. The acquisition group policy table 223 stores policies to be used when acquisition groups are set by selecting particular apparatus from apparatus that are management subjects of the management server 101.

A column 801 stores policy IDs. A policy ID is an identifier for uniquely identifying a policy for setting an acquisition group. Inputting data to be stored in the column 801 can be omitted by specifying one of columns that are used in the table, or a combination of a plurality of columns of the table. The policy IDs may be assigned automatically by the management server 101 in ascending order or other orders.

A column 802 stores policies. The acquisition group generating part 217, which is illustrated in FIGS. 15A and 15B, generates an acquisition group based on a policy. Examples of policies include "the servers 104 have a cluster configuration", "the servers 104 have a backup configuration", "the servers 104 have a load balancing configuration", one about the relation between a hypervisor and virtual servers, and one about the relation between virtual machines that are on the same hypervisor. Those policies may be acquired directly from an input from the user (administrator) or an application that cooperates with the management server 101, or may be generated by the management server 101 based on an input from the user (administrator) or information held by an application that cooperates with the management server 101, or may be generated by the management server 101 from information of management subject apparatus that is held by the management server 101.

A column 803 stores priority levels set to policies. A priority level set to a policy is referred to when an acquisition group is generated based on the policy in order to determine a group priority level. The priority level can be changed by an input from the user (administrator) or by an application that cooperates with the management server 101 as the need arises. A smaller value indicates a higher priority level.

A column 804 stores information about whether or not acquiring information is given priority in case of failure. The information, however, is not used in the first embodiment.

FIG. 9 shows the acquisition group table 224 which is stored on the management server 101. The acquisition group table 224 stores in each entry an acquisition group, which is a group of management subject apparatus whose information is to be acquired in substantially the same time slot. With the acquisition groups as reference, the management server 101 changes the order in which information of management subject apparatus is acquired. Pieces of apparatus information are regarded as being acquired in the same time slot when a time period between the information acquisition of the first apparatus in an acquisition group and the information acquisition of the last apparatus in the acquisition group is short (for example, tens of minutes to a few minutes).

A column 901 stores group IDs. A group ID is an identifier for uniquely identifying an acquisition group. Inputting data to be stored in the column 901 can be omitted by specifying one of columns that are used in the table, or a combination of a plurality of columns of the table. The group IDs may be assigned automatically by the management server 101 in ascending order or other orders.

A column 902 stores the priority levels of groups. The group priority levels are set based on priority levels in the column 803 of the acquisition group policy table 223, and are used to determine acquisition groups that are to be given priority when the order of acquiring information of management subject apparatus is determined.

A column 903 stores the registration status of groups. The registration status of a group is information that is referred to in order to avoid duplication in setting acquisition groups when the order of acquiring information of management subject apparatus is determined, and is changed to "registered" after all management subject apparatus that comprise the group are registered in the acquisition order table 225, which is shown in FIG. 10.

A column 904, a column 905, a column 906, and a column 907 store related node IDs. A related node ID is the node ID, which is shown in FIGS. 6A and 6B, of an apparatus that is a constituent of a group. While only four columns that store related node IDs, the columns 904, 905, 906, and 907, are described in this embodiment, the count of related node ID columns varies depending on how many management subject apparatus comprise a group.

A column 908 stores information about whether or not acquiring information is given priority in case of failure. This information is set based on priority levels in the column 804 of the acquisition group policy table 223. The information, however, is not used in the first embodiment.

FIG. 10 shows the acquisition order table 225 which is stored on the management server 101. The acquisition order table 225 stores information of an information acquisition order in which the management server 101 acquires information of management subject apparatus. A column 1001 stores acquisition numbers. The acquisition numbers indicate an order that is referred to when information is acquired and, in this embodiment, apparatus information is acquired in ascending order of values assigned to rows of the table as the acquisition numbers.

A column 1002 stores the segment IDs of management segments to which the node IDs in the column 1003 belong.

A column 1003 stores node IDs assigned to information acquisition polling threads.

FIG. 18 shows the temporary registration table 227 which is stored on the management server 101. The temporary registration table 227 is a table that is used to temporarily hold information of an acquisition group (related group) in processing that is executed by the acquisition order determining part.

A column 1701 stores group IDs of acquisition groups. A column 1702 stores the group priority levels of acquisition groups. A column 1703 stores the group registration status of information of acquisition groups.

The columns 1702 and 1703 in particular are respectively synchronized with the columns 902 and 903 of the acquisition group table 224. The columns 902 and 903 of the acquisition group table 224 may therefore be referred to based on a group ID in the column 1701, instead of providing the columns 1702 and 1703 in the temporary acquisition table 227 as in this embodiment.

FIG. 19 shows the polling thread assignment table 228. The polling thread assignment table 228 stores information of management subject apparatus which is acquired by information acquisition polling threads from the management subject apparatus. The information acquiring part 213 refers to the polling thread assignment table 228 when acquiring information.

A column 1801 stores acquisition numbers. The acquisition numbers indicate an order that is referred to when the information acquisition polling threads 231 acquire information and, in this embodiment, apparatus information is acquired in ascending order of values assigned to rows of the table as the acquisition numbers.

A column 1802 and a column 1803 store (the node IDs of) management subject apparatus that are assigned to information acquisition polling threads. While only two columns, the columns 1802 and 1803, are described in this embodiment, the count of node ID columns varies depending on how many information acquisition polling threads the management server 101 uses.

Figure 11:
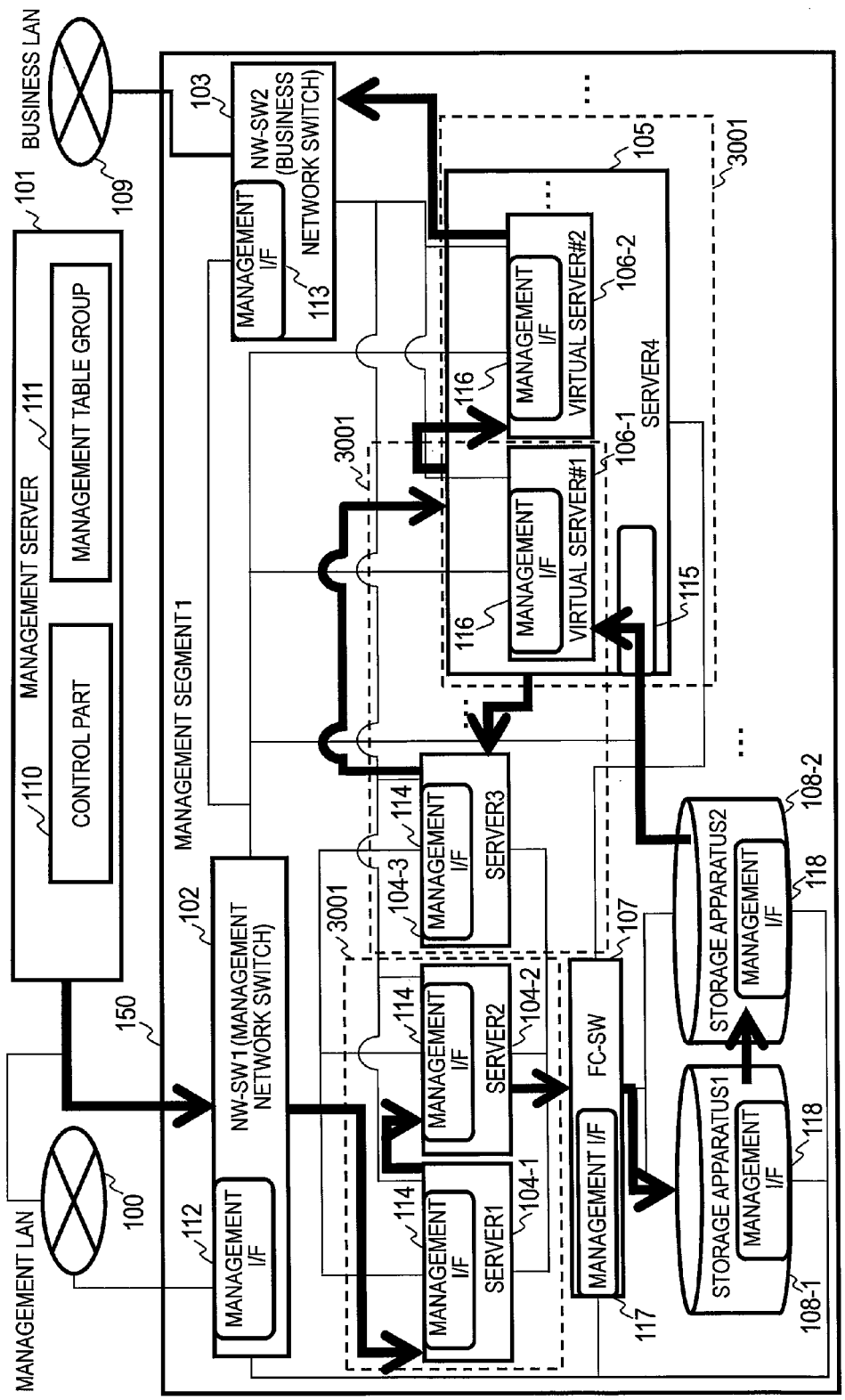
FIG. 11 is a block diagram outlining an example of processing that is executed in the computer system according to the first embodiment of this invention.

FIG. 11 is a block diagram outlining an example of processing that is executed in the computer system. When acquiring information of management subject apparatus, the management server 101 determines the order in which information of management subject apparatus is acquired based on topologies that are registered in the configuration information topology table 226, and acquisition groups 3001 (inside the broken lines in FIG. 11) that are registered in the acquisition group table 224.

The order of acquiring the information is determined basically by the order in which topologies are registered. In the case where a management subject apparatus belongs to one of the acquisition groups 3001, however, the information acquisition order is changed so that information of the management subject apparatus belonging to the acquisition group 3001 (Servers 1 and 2 in FIG. 11) is acquired preferentially.

In the case where a management subject apparatus belongs to a plurality of acquisition groups 3001, the information acquisition order is determined so that information acquisition starts with management subject apparatus of the acquisition group 3001 that has a high priority level. This puts management subject apparatus that have a coupling relationship with one another in places in an information acquisition order that are close to one another. In addition, out of those management subject apparatus, management subject apparatus that are related to one another as constituents of the same acquisition group 3001 are given priority in information acquisition and are put in places in an information acquisition order that are close to one another.

Figure 12:
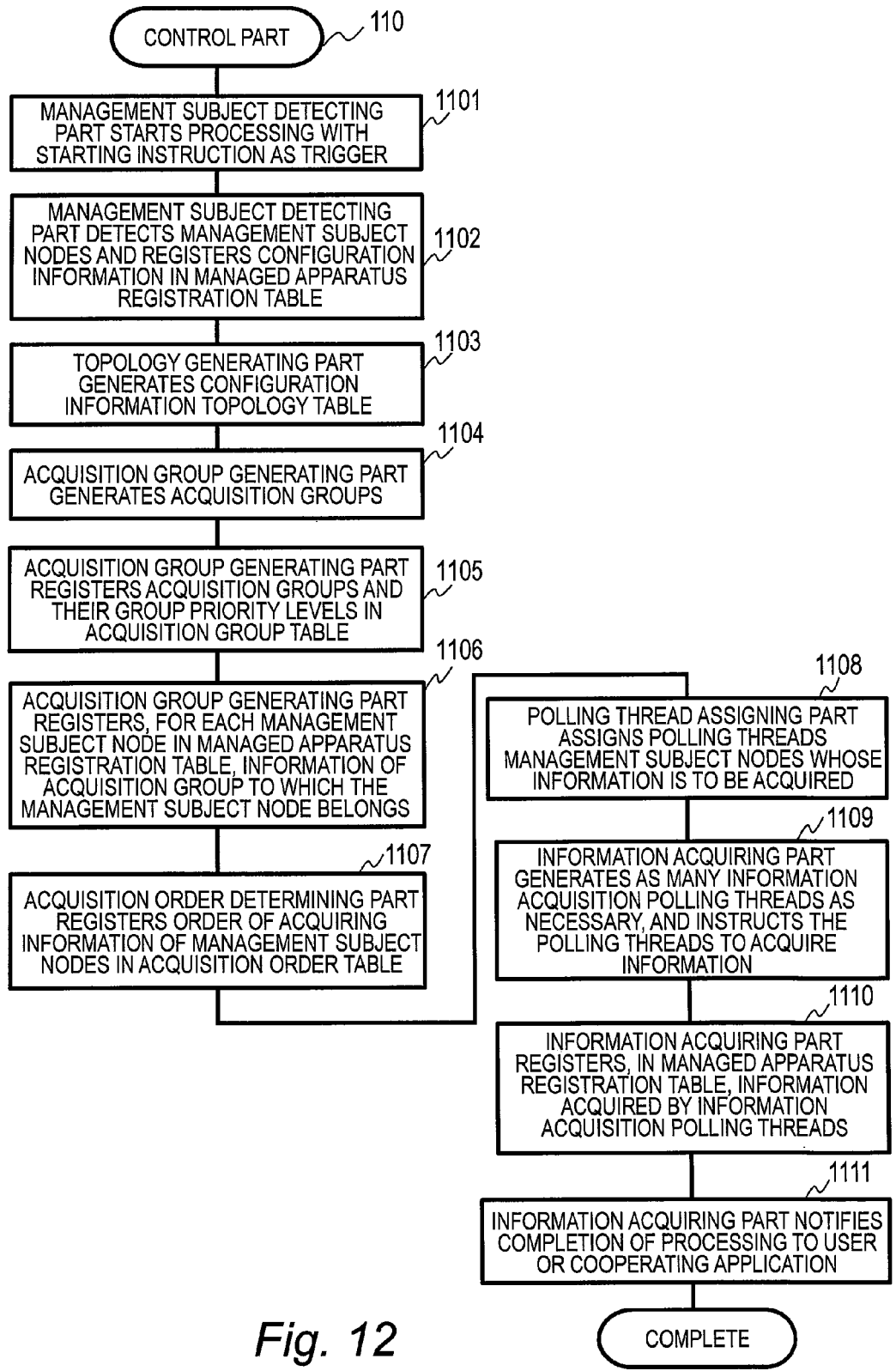
FIG. 12 is a flow chart illustrating an example of processing that is executed in the control part according to the first embodiment of this invention.

FIG. 12 is a flow chart illustrating an example of processing that is executed in the control part 110 of the management server 101.

In Step 1101, the management subject detecting part 214 starts management subject apparatus searching processing with an input from the user (administrator), or a starting instruction from an application that cooperates with the management server 101 or from a schedule function of the management server 101, as a trigger.

In Step 1102, the management subject detecting part 214 detects management subject apparatus and registers detected configuration information in the managed apparatus registration table 222.

In Step 1103, the topology generating part 215 generates the configuration information topology table 226 which shows the coupling relationship between management subject apparatus.

In Step 1104, with an input from the user (administrator) or a starting instruction from an application that cooperates with the management server 101 or from the schedule function of the management server 101 as a trigger, the acquisition group generating part 217 generates acquisition groups based on information in the acquisition group policy table 223 and the managed apparatus registration table 222.

In Step 1105, the acquisition group generating part 217 registers the acquisition groups and the group priority levels of the acquisition groups in the acquisition group table 224.

In the acquisition group table 224, groups are set so that a backup source server, a backup destination server, and apparatus coupling these servers comprise one group, as indicated by the acquisition group policy table 223 which is described later. The group is set as a computer group (acquisition group) from which configuration information is acquired by the management server 101, and the management server 101 acquires information of computers and apparatus on an acquisition group-by-acquisition group basis. Other than the acquisition group described above which is based on the backup relation, a plurality of computers among which load is balanced may be set as one acquisition group, a plurality of computers to which a cluster configuration is set may be set as one acquisition group, virtual servers and a virtualization part such as a hypervisor (or a physical computer) may comprise one acquisition group, and a plurality of servers in which pieces of software cooperate with one another may be extracted as an acquisition group. A computer group in which a Web server, an application server, and a database server cooperate with one another can be a plurality of servers in which pieces of software cooperate with one another and which is extracted as one acquisition group. In the manner described above, the management server 101 can extract related servers out of a plurality of servers and set the extracted servers as an acquisition group under a given policy or condition.

In Step 1106, the acquisition group generating part 217 registers, for each management subject node in the managed apparatus registration table 222, information of an acquisition group to which the management subject node belongs.

In Step 1107, the acquisition order determining part 216 refers to the managed apparatus registration table 222, the acquisition group table 224, and the configuration information topology table 226 to determine the order of acquiring information of management subject nodes, and registers the determined order in the acquisition order table 225.

In Step 1108, the polling thread assigning part 218 refers to the acquisition order table 225, and assigns polling threads management subject nodes from which information is to be acquired.

In Step 1109, the information acquiring part 213 refers to the polling thread assignment table 228 to generate as many information acquisition polling threads 231 as necessary, and instructs the generated polling threads to acquire information.

In Step 1110, the information acquiring part 213 registers the information acquired by the information acquisition polling threads 231 in the managed apparatus registration table 222.

In Step 1111, the information acquiring part 213 notifies the user or a cooperating application of the completion of the processing.

FIG. 13 is a flow chart illustrating an example of processing that is executed in the management subject detecting part 214 of the management server 101. This processing is executed in Step 1101 of FIG. 12.

In Step 1201, the management subject detecting part 214 detects an input from the user (administrator), or a starting instruction from an application that cooperates with the management server 101 or from the schedule function of the management server 101.

In Step 1202, the management subject detecting part 214 executes the management subject apparatus searching processing.

In Step 1203, management subject apparatus are detected and the management subject detecting part 214 registers the detected configuration information in the managed apparatus registration table.

In Step 1204, the management subject detecting part 214 notifies the acquisition group generating part 217 of the completion of the processing, thereby completing the processing.

FIG. 14 is a flow chart illustrating an example of processing that is executed by the topology generating part 215 of the management server 101. This processing is executed in Step 1103 of FIG. 12.

In Step 1301, the topology generating part 215 refers to the managed apparatus registration table 222. In Step 1302, the topology generating part 215 generates the configuration information topology table 226. The topology generating part 215 here generates the configuration information topology table by detecting coupling relationships based on the configuration information of the management subject apparatus which has been referred to in Step 1301.

In Step 1303, the topology generating part 215 notifies the acquisition group generating part 217 of the completion of the processing, thereby completing the processing.

FIGS. 15A and 15B are a flow chart illustrating an example of processing that is executed by the acquisition group generating part 217 of the management server 101. This processing is executed in Step 1104 of FIG. 12.

In Step 1401 of FIG. 15A, the acquisition group generating part 217 acquires information of the management subject apparatus from the managed apparatus registration table 222.

In Step 1402, the acquisition group generating part 217 determines whether or not an acquisition group policy for generating an acquisition group, information that directly specifies an acquisition group, or information of management subject apparatus in an acquisition group has been input from the user (administrator) or from an application that cooperates with the management server 101. When it is determined as a result that such information has been input, the acquisition group generating part 217 proceeds to Step 1412 and proceeds to Step 1404 when it is determined that such information has not been input.

In Step 1412, the acquisition group generating part 217 determines whether or not the information input from the user (administrator) or an application that cooperates with the management server 101 includes an acquisition group policy. The acquisition group generating part 217 proceeds to Step 1413 when an acquisition group is included, and proceeds to Step 1403 otherwise.

In Step 1413, the acquisition group generating part 217 registers the acquisition group policy determined in Step 1412 in the acquisition group policy table 223, which is shown in FIG. 8, and proceeds to Step 1404.

In Step 1403, the acquisition group generating part 217 receives the information input from the user (administrator) or an application that cooperates with the management server 101, and proceeds to Step 1406.

In Step 1406, the acquisition group generating part 217 selects management subject apparatus about which the information has been received in Step 1403 from an application that cooperates with the management server 101, and proceeds to Step 1408.

In Step 1404, the acquisition group generating part 217 refers to the acquisition group policy table 223 and proceeds to Step 1405 of FIG. 15B.

In Step 1405, the acquisition group generating part 217 determines whether or not the management subject apparatus whose information has been acquired in Step 1401 include management subject apparatus that match a policy in the acquisition group policy table 223. When it is determined as a result that there are management subject apparatus that match a policy in the acquisition group policy table 223, the acquisition group generating part 217 proceeds to Step 1407, and proceeds to Step 1411 when no management subject apparatus match a registered policy.

In Step 1407, the acquisition group generating part 217 selects the management subject apparatus that have been determined in Step 1405 as a match to a registered policy, and proceeds to Step 1408.

In Step 1408, the acquisition group generating part 217 registers the management subject apparatus selected in Step 1407 in the acquisition group table 224 as an acquisition group.

In Step 1409, the acquisition group generating part 217 sets group priority levels to acquisition groups based on priority levels set to acquisition group policies, and proceeds to Step 1410.

In Step 1410, the acquisition group generating part 217 sets, for each management subject apparatus, a related acquisition group ID in the column 611 in an entry of the managed apparatus registration table 222 where a related group of the management subject apparatus is stored. The acquisition group generating part 217 then proceeds to Step 1411.

In Step 1411, the acquisition group generating part 217 notifies the acquisition order determining part 216 of the completion of acquisition group setting processing, and ends the processing of the acquisition group generating part 217.

FIGS. 16A and 16B are a flow chart illustrating an example of processing that is executed by the acquisition order determining part 216 of the management server 101. This processing is executed in Step 1107 of FIG. 12 and, specifically, started in response to the notification in Step 1411 of FIG. 15B.

In Step 1501, the acquisition order determining part 216 refers to the managed apparatus registration table 222, the acquisition group table 224, and the configuration information topology table 226.

In Step 1502, the acquisition order determining part 216 changes the registration status (the column 612) to "unregistered" in every entry of the managed apparatus registration table 222.

In Step 1503, the acquisition order determining part 216 generates the temporary registration table 227, which is shown in FIG. 18.

In Step 1504, the acquisition order determining part 216 executes loop processing in the registration order of the configuration information topology table 226, until the registration status becomes "registered" for every management subject apparatus in the managed apparatus registration table 222.

In Step 1505, the acquisition order determining part 216 determines whether or not the registration status of a management subject apparatus is "registered" in the column 612. The acquisition order determining part 216 proceeds to Step 1506 in the case where the column 612 holds other values than "registered", and proceeds to Step 1516 in the case where the column 612 holds "registered". In Step 1516, when every management subject apparatus has been processed, the acquisition order determining part 216 proceeds to Step 1513. In Step 1516, when not every management subject apparatus has been processed, the acquisition order determining part 216 returns to the head of the loop processing of Step 1504 to repeat the processing described above.

In Step 1506, the acquisition order determining part 216 registers, in the acquisition order table 225, the management subject apparatus whose registration status has been determined in Step 1505 as "unregistered".

In Step 1507, the acquisition order determining part 216 changes the registration status to "registered" for a group (1701) that is registered in the temporary registration table 227 and that has "registered" as the registration status of all of its related nodes. The acquisition order determining part 216 then deletes the group from the temporary registration table 227.

In Step 1508, the acquisition order determining part 216 determines whether or not related groups of the management subject apparatus that have been registered in Step 1506 include a group that has "unregistered" as the registration status and that is not registered in the temporary registration table. When there is a group that meets the condition, the acquisition order determining part 216 proceeds to Step 1510 of FIG. 16B. When no group meets the condition, the acquisition order determining part 216 proceeds to Step 1509 of FIG. 16B.

In Step 1509 of FIG. 16B, the acquisition order determining part 216 determines whether or not the group that is currently being processed is registered in the temporary registration table 227. The acquisition order determining part 216 proceeds to Step 1516 in the case where the currently processed group is not registered in the temporary registration table 227 and returns to the head of the loop processing of Step 1504. In the case where the currently processed group is registered in the temporary registration table 227, the acquisition order determining part 216 proceeds to Step 1511.

In Step 1510, the acquisition order determining part 216 registers the related group whose registration status is "unregistered" in the temporary registration table 227.

In Step 1511, the acquisition order determining part 216 selects a group that has the highest priority level in the temporary registration table 227.

In Step 1512, the acquisition order determining part 216 selects one related node whose registration status is "unregistered" out of related nodes that comprise the group selected in Step 1511, and returns to Step 1506 of FIG. 16A to repeat the processing described above.

In Step 1516, the acquisition order determining part 216 determines whether or not the registration status has changed to "registered" for every managed apparatus in the managed apparatus registration table, and proceeds to Step 1513 in the case where the registration status of every managed apparatus is "registered". Otherwise, the acquisition order determining part 216 proceeds to Step 1505 to process the next managed apparatus registered in the managed apparatus registration table.

In Step 1513, the loop processing of Step 1504 ends and the acquisition order determining part 216 proceeds to Step 1514 in the case where a condition for ending the loop processing of Step 1504 is fulfilled.

In Step 1514, the acquisition order determining part 216 deletes the temporary registration table 227 generated in Step 1503.

In Step 1515, the acquisition order determining part 216 notifies that the order of acquiring information of management subject apparatus has been determined to the polling thread assigning part 218, and ends the processing of the acquisition order determining part 216.

Through the processing described above, the management server 101 sets acquisition groups to apparatus in the managed apparatus registration table 222, determines the order of acquiring information on an acquisition group-by-acquisition group basis, and stores the determined order in the temporary registration table 227. The management server 101 can then determine the order of acquiring information of apparatus in acquisition groups by following the order of acquisition groups in the temporary registration table 227.

FIG. 20 is a flow chart illustrating an example of processing that is executed by the polling thread assigning part 218 of the management server 101. This processing is executed in Step 1108 of FIG. 12 and, specifically, executed with a notification that is sent in Step 1515 of FIG. 16B by the acquisition order determining part 216 as a trigger.

The polling thread assigning part 218 executes processing of assigning the information acquisition polling threads 231 to management subject apparatus in the acquisition order table 225 in order to acquire information of the management subject apparatus.

In Step 1901, the polling thread assigning part 218 generates the polling thread assignment table 228. The count of columns (the column 1802 and the column 1803) in the polling thread assignment table 228 generated varies depending on the count of the information acquisition polling threads 231 that the management server 101 uses to acquire information. The count of the information acquisition polling threads 231 generated by the management server 101 may be set by the administrator in advance.

Alternatively, the polling thread assigning part 218 may estimate how many information acquisition polling threads 231 can be generated from the machine specifications of the management server 101, and automatically set the estimated count.

In Step 1902, the polling thread assigning part 218 refers to the acquisition order table 225.

In Step 1903, the polling thread assigning part 218 starts loop processing in which processing of Step 1904 is repeated to process every management subject apparatus stored in the acquisition order table 225, in the order of acquisition numbers.

In Step 1904, the polling thread assigning part 218 acquires the node IDs of the management subject apparatus in the order of the acquisition numbers (1001) in the acquisition order table 225, and stores the node IDs in the column 1802 or 1803 of the polling thread assignment table 228. This processing starts with an acquisition number "1" in the acquisition order table 225 by storing "NW-SW 1" in a polling thread 1 column (1802) of the polling thread assignment table 228, and proceeds to storing "Server 1" which has an acquisition number "2" in a polling thread 2 column (1803). The polling thread assigning part 218 next adds a new entry to the polling thread assignment table 228 in order to store "Server 2" which has an acquisition number "3", and stores "Server 2" in the polling thread 1 column (1802). In this manner, polling threads are assigned in the order of acquisition numbers and, when there is no longer a polling thread to assign, a new entry is added.

In Step 1905, when the loop processing started in Step 1903 fulfills every loop condition, the polling thread assigning part 218 ends the loop processing.

In Step 1906, the polling thread assigning part 218 notifies the information acquiring part 213 of the completion of the processing, thereby completing the processing of the polling thread assigning part 218.

Through the processing described above, each node ID in the acquisition order table 225 is assigned one of the information acquisition polling threads 231, with the result that the polling thread assignment table 228 is generated.

FIG. 17 is a flow chart illustrating an example of processing that is executed by the information acquiring part 213 of the management server 101. This processing is executed in Steps 1109, 1110, and 1111 of FIG. 12 and, specifically, started with the notification transmission in Step 1906 of FIG. 20 by the polling thread assigning part 218 as a trigger.

In Step 1601, the information acquiring part 213 changes values in the column 613 which is a regular acquisition column to "unacquired" for every managed apparatus in the managed apparatus registration table 222. In Step 1602, the information acquiring part 213 refers to the polling thread assignment table 228.

In Step 1603, the information acquiring part 213 generates as many information acquisition polling threads 231 as the count of polling threads in the polling thread assignment table 228. This step can be skipped in the case where information acquisition polling threads have already been generated. In the example of FIG. 19, two information acquisition polling threads 231, Polling Thread 1 and Polling Thread 2, are activated.

In Step 1604, loop processing is started which is kept executed until information is acquired from every management subject apparatus in the polling thread assignment table 228.

In Step 1605, the information acquiring part 213 controls the information acquisition polling threads 231 so that the information acquisition polling threads 231 acquire information of their respective management subject apparatus assigned as indicated in the polling thread assignment table 228.

In Step 1606, the information acquiring part 213 registers the information of the management subject apparatus acquired by the information acquisition polling threads 231 in the managed apparatus registration table 222.

In Step 1607, when information acquisition is finished for every management subject apparatus in the polling thread assignment table 228, the information acquiring part 213 ends the loop processing started in Step 1604, and proceeds to Step 1608.

In Step 1608, the information acquiring part 213 deletes the information acquisition polling threads generated in Step 1603. This step is skipped in the case where the information acquisition polling threads are to be kept in the memory instead of deleted.

In Step 1609, the completion of the information acquiring processing is notified to the user (administrator) or an application that cooperates with the management server 101, and the processing is completed.

As described above, while the order of acquiring information of management subject apparatus is basically determined by the order in which topologies are registered, when there are management subject apparatus belonging to the acquisition groups 3001, the information acquisition order can be changed so that information of the management subject apparatus that belong to the acquisition groups is acquired preferentially.

In this invention, when a management subject apparatus belongs to a plurality of acquisition groups, the information acquisition order is determined so that information acquisition starts with management subject apparatus of an acquisition group that has a high priority level. This puts management subject apparatus that have a coupling relationship with one another in places in the information acquisition order that are close to one another, thereby making it possible to acquire pieces of information of these management subject apparatus in the same time slot. In addition, management subject apparatus that are related to one another as constituents of the same acquisition group can be given priority in information acquisition and are put in places in the information acquisition order that are close to one another. A significant gap (for example, several hours) between the time when a piece of information is acquired and the time when another piece of information is acquired in an acquisition group is thus prevented, and pieces of information of apparatus in the same acquisition group can be acquired in substantially the same time slot (for example, within tens of minutes or within a few minutes).

Information of an apparatus group used by an application that cooperates with the management server, or of a group specified by the administrator, or information of management subject apparatus in the group can be acquired quickly in the manner described above.

Second Embodiment

In a second embodiment of this invention, in the case where there is a constraint to the length of time that can be spent to acquire information, the constraint is attached to an acquisition group in advance and, after the information is acquired, the management server 101 determines whether or not the constraint has been fulfilled. In the case where the constraint has not been fulfilled, the management server 101 reacquires information, or notifies the failure of information acquisition to the user (administrator) or an application that cooperates with the management server 101. Configuration information that fulfills a condition input by the user (administrator) or set by an application that cooperates with the management server 101 can be provided in this manner.

Figure 21:
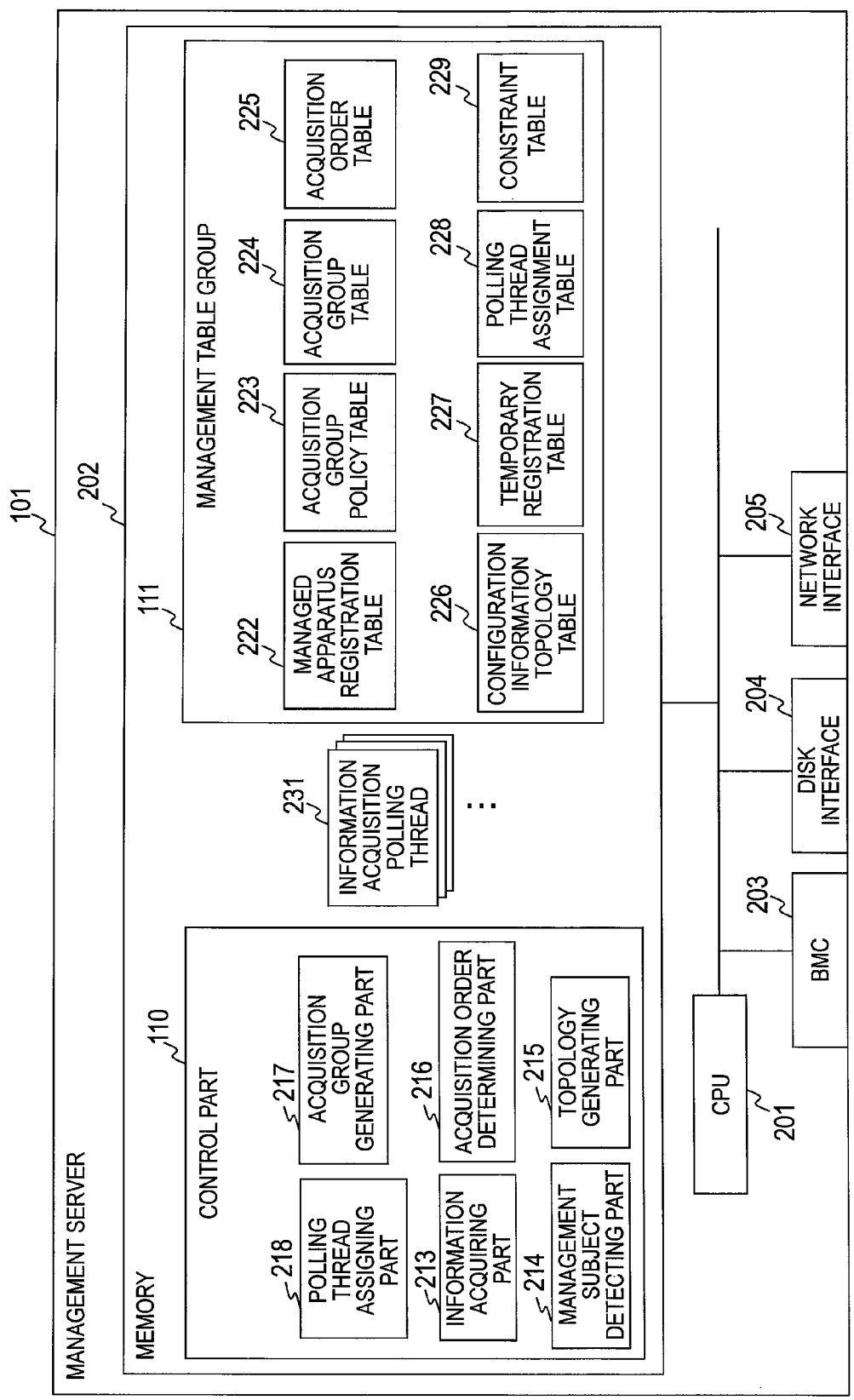
FIG. 21 is a block diagram illustrating the configuration of the management server according to a second embodiment of this invention.

A computer system used in the second embodiment has the same configuration as that of the computer system of the first embodiment, which is illustrated in FIG. 1. The configuration of the management server 101 in the second embodiment, however, differs in that a constraint table 229, which is shown in FIG. 22, is used in addition to the management server configuration of the first embodiment as illustrated in FIG. 21. The management server 101 of the second embodiment also differs from the management server 101 of the first embodiment in a part of processing that is executed by the information acquiring part 213.

FIG. 22 shows the constraint table 229 which is stored on the management server 101. The constraint table 229 stores constraints input by the user (administrator) or input when an application that cooperates with the management server 101 issues an information acquisition command.

A column 2001 of the constraint table 229 stores constraint IDs for identifying constraints. A column 2002 stores the specifics of input or set constraints. A column 2003 stores time constraints to be followed when acquiring configuration information which are extracted from constraints. A column 2004 stores the group IDs of groups to which constraints are applied.

Figure 23A:
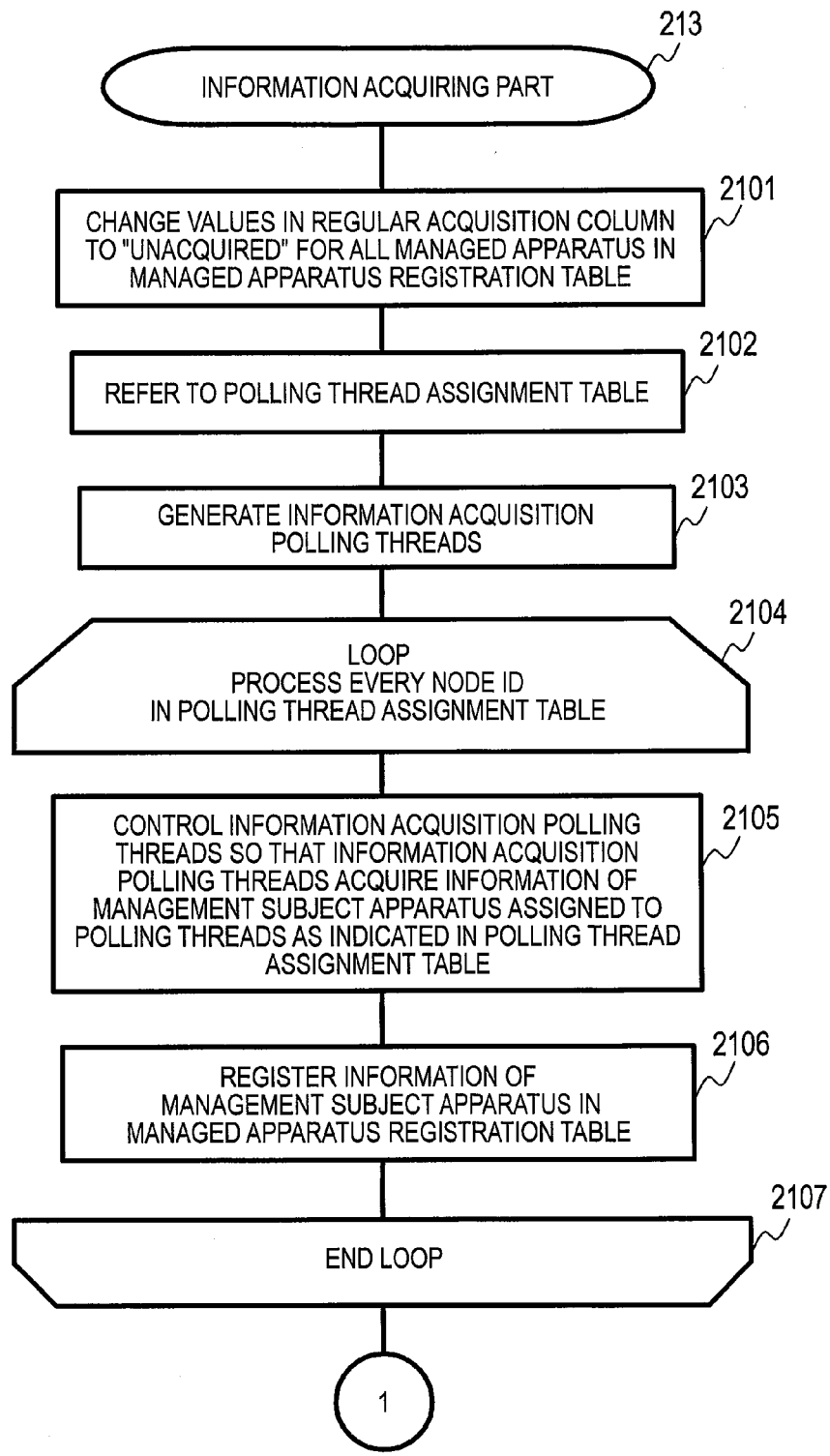
FIG. 23A is a flow chart illustrating an example of processing of the first half that is executed by the information acquiring part according to the second embodiment of this invention.
Figure 23B:
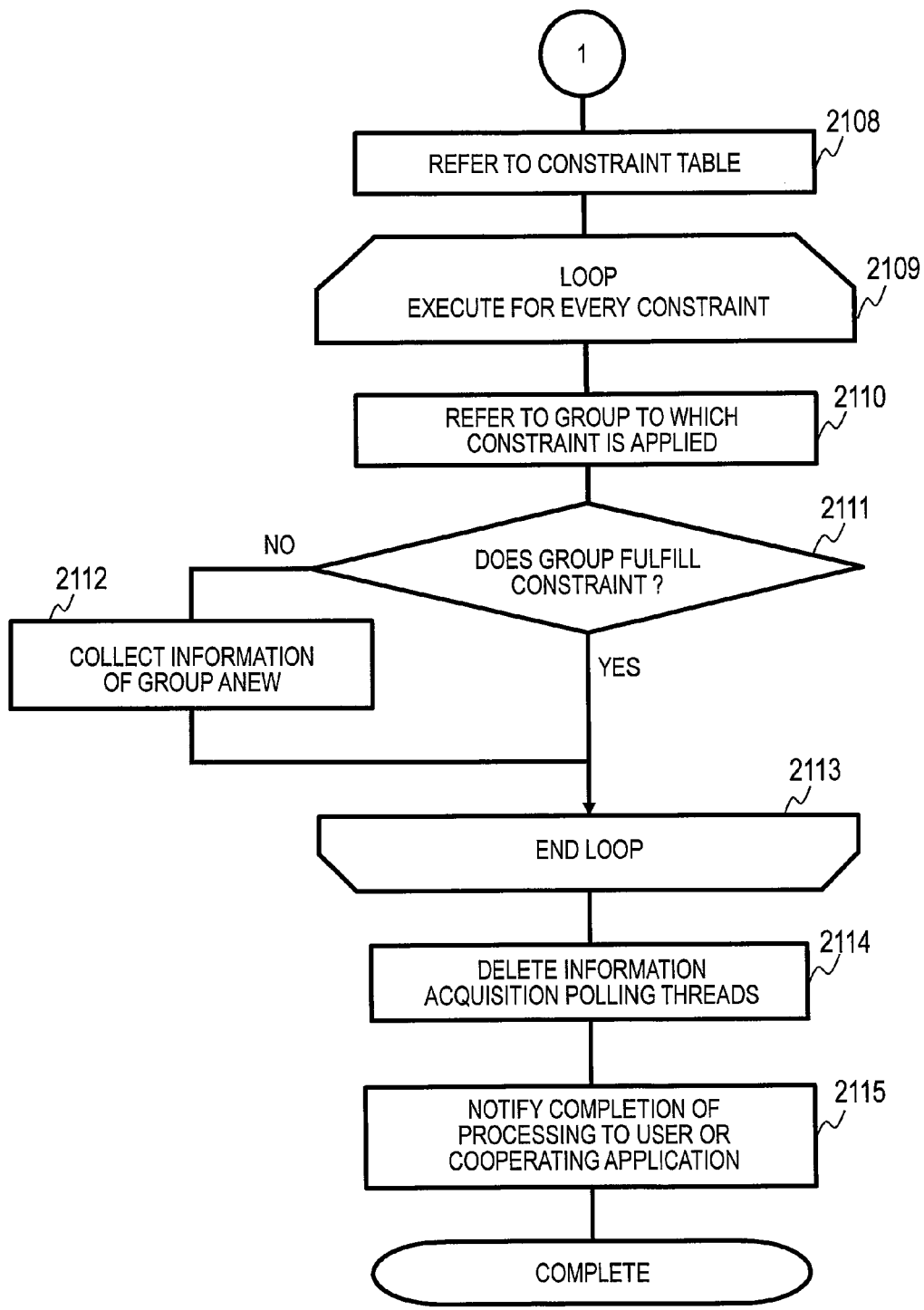
FIG. 23B is a flow chart illustrating an example of processing of the first half that is executed by the information acquiring part according to the second embodiment of this invention.

FIGS. 23A and 23B are a flow chart illustrating an example of processing that is executed by the information acquiring part 213 in the second embodiment.

Steps 2101 to 2107 of FIG. 23A are the same as Steps 1601 to 1607 of the processing of the information acquiring part 213 in the first embodiment, which is illustrated in FIG. 17.

In Step 2108, the information acquiring part 213 refers to the constraint table 229. In Step 2109, the information acquiring part 213 executes loop processing which is repeated until every constraint in the constraint table 229 is processed and which ends in Step 2113.

In Step 2110, the information acquiring part 213 refers to the column 2004 of the constraint table 229 in order to find out a group to which the constraint that is being processed is applied.

In Step 2111, the information acquiring part 213 determines whether or not the group found by referring to the column 2004 in Step 2110 fulfills the constraint. For example, in the case of determining whether or not a constraint "pieces of information of management subject apparatus in the same acquisition group are acquired within 1 hour" is fulfilled, the information acquiring part 213 compares the time when information of the first management subject apparatus among related nodes in the group has been acquired and the time when information of the last management subject apparatus in the group has been acquired, and determines whether or not the time gap between the two is within 1 hour. The information acquiring part 213 proceeds to Step 2113 in the case where the constraint is fulfilled, and proceeds to Step 2112 in the case where the constraint is not fulfilled.

In Step 2112, the information acquiring part 213 collects anew information of the group for which whether or not the constraint is fulfilled has been determined in Step 2111. Instead of collecting the information anew, the information acquiring part 213 may notify that the constraint is not fulfilled to the user terminal (not shown) or a cooperating application in this step.

In Steps 2114 and 2115 which are the same as Steps 1608 and 1609 of FIG. 17, the information acquiring part 213 deletes the information acquisition polling threads and then notifies the completion of the information acquisition processing to the user (administrator) or an application that cooperates with the management server 101, thereby completing the processing.

As described above, the management server 101 according to the second embodiment determines, after configuration information is acquired, whether or not an acquisition group has fulfilled a constraint, and can inform the user terminal (not shown) or an application that cooperates with the management server 101 of whether or not the acquisition group has fulfilled the constraint.

Third Embodiment

A third embodiment of this invention is configured so that, when the management server 101 acquires information and detects an alert to a failure or a trouble that has occurred (failure information), subjects of subsequent information acquisition can be changed.

The management server 101 identifies apparatus belonging to the same acquisition group as a management subject apparatus that has issued the alert because there is a chance that those apparatus are experiencing a failure from the same cause. The management server 101 delays the acquisition of information from the identified apparatus or assigns other polling threads to the identified apparatus, to thereby avoid an overall delay in the information acquiring processing and an alert storm in which numerous alerts are notified.

This also allows the management server 101 to increase the count of polling threads assigned so that information of nodes that belong to the same acquisition group as the management subject apparatus by which the alert has been notified is acquired preferentially in order to analyze the failure by root cause analysis (RCA).

Figure 24:
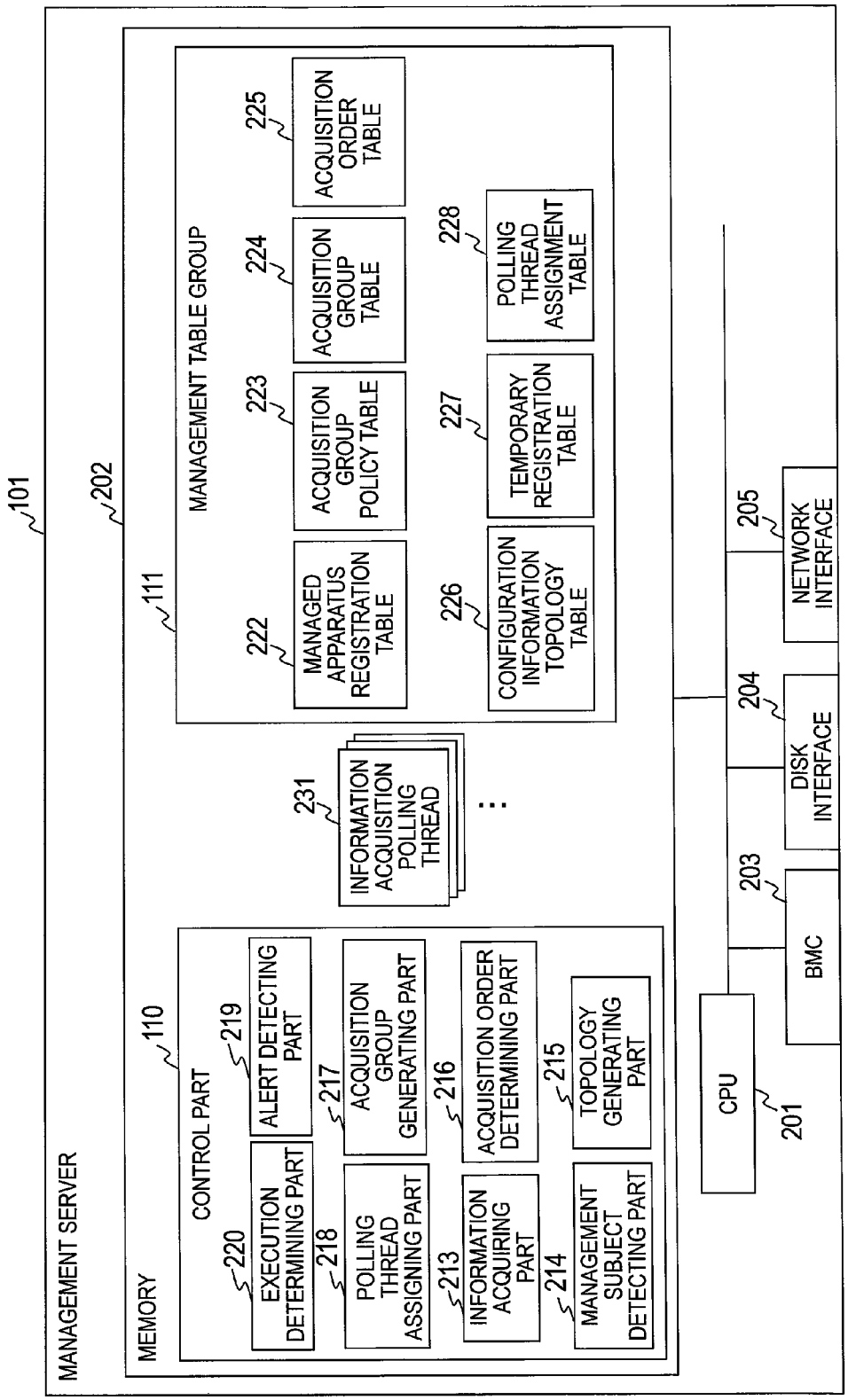
FIG. 24 is a block diagram illustrating the configuration of the management server according to a third embodiment of this invention.

A computer system used in the third embodiment has the same configuration as that of the computer system of the first embodiment which is illustrated in FIG. 1. The configuration of the management server 101 in the third embodiment, however, differs in that an alert detecting part 219 and an execution determining part 220 are added to the management server configuration of the first embodiment as illustrated in FIG. 24.

Figure 25:
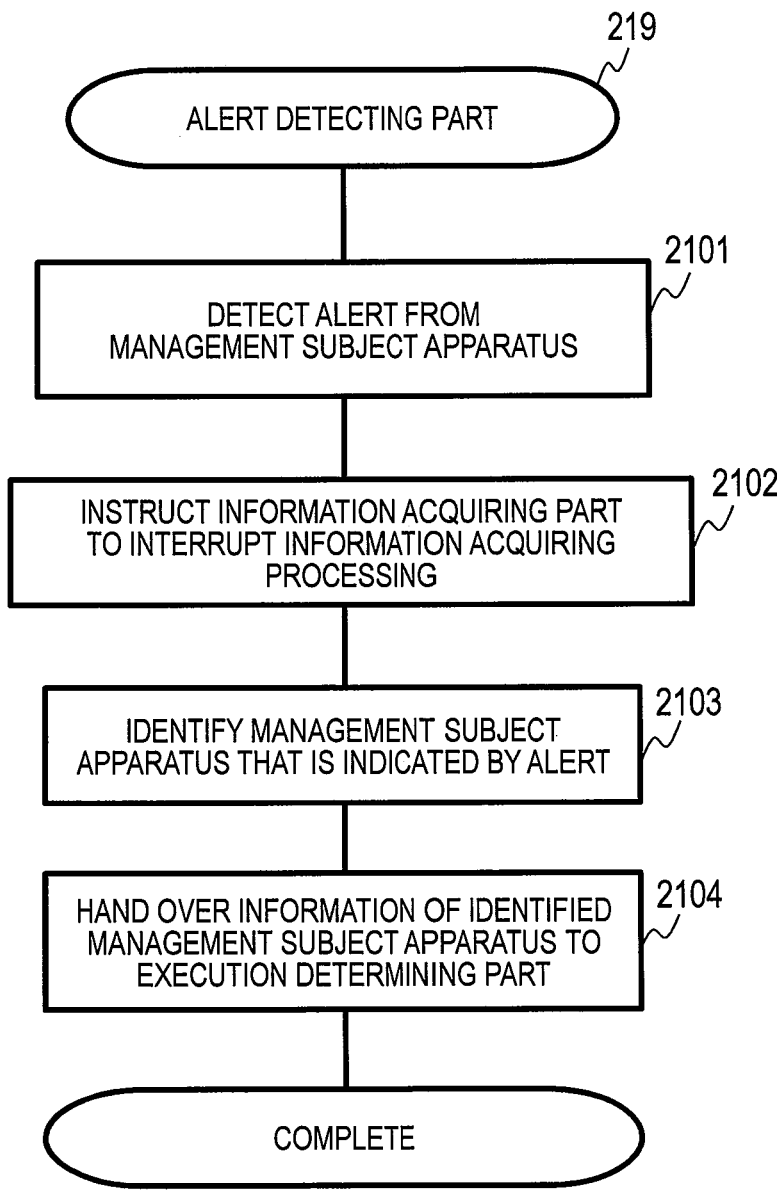
FIG. 25 is a flow chart illustrating an example of processing that is executed by the alert detecting part according to the third embodiment of this invention.

FIG. 25 is a flow chart illustrating an example of processing that is executed by the alert detecting part 219 of the management server 101.

In Step 2101, the alert detecting part 219 detects an alert from a management subject apparatus. When one of the information acquisition polling threads 231 receives an alert from a management subject apparatus while acquiring configuration information, the information acquisition polling thread 231 notifies the alert to the alert detecting part 219. The alert detecting part 219 can detect an alert from a management subject apparatus in this manner. Alternatively, the alert detecting part 219 may instead detect an alert input from the user (administrator), or may detect an alert from an event notification sent by an application that cooperates with the management server 101.

In Step 2102, the alert detecting part 219 sends an instruction to interrupt the information acquiring processing to the information acquiring part 213, to thereby stop the information acquisition polling threads 231 from acquiring information.

In Step 2103, the alert detecting part 219 identifies the management subject apparatus by which the alert has been notified.

In Step 2104, the alert detecting part 219 hands over information of the management subject apparatus identified in Step 2102 to the execution determining part 220, and ends the processing of the alert detecting part 219.

Through the processing described above, the alert detecting part 219 stops information acquisition by the information acquisition polling threads 231 for an apparatus where an alert is detected out of management subject apparatus.

Figure 26:
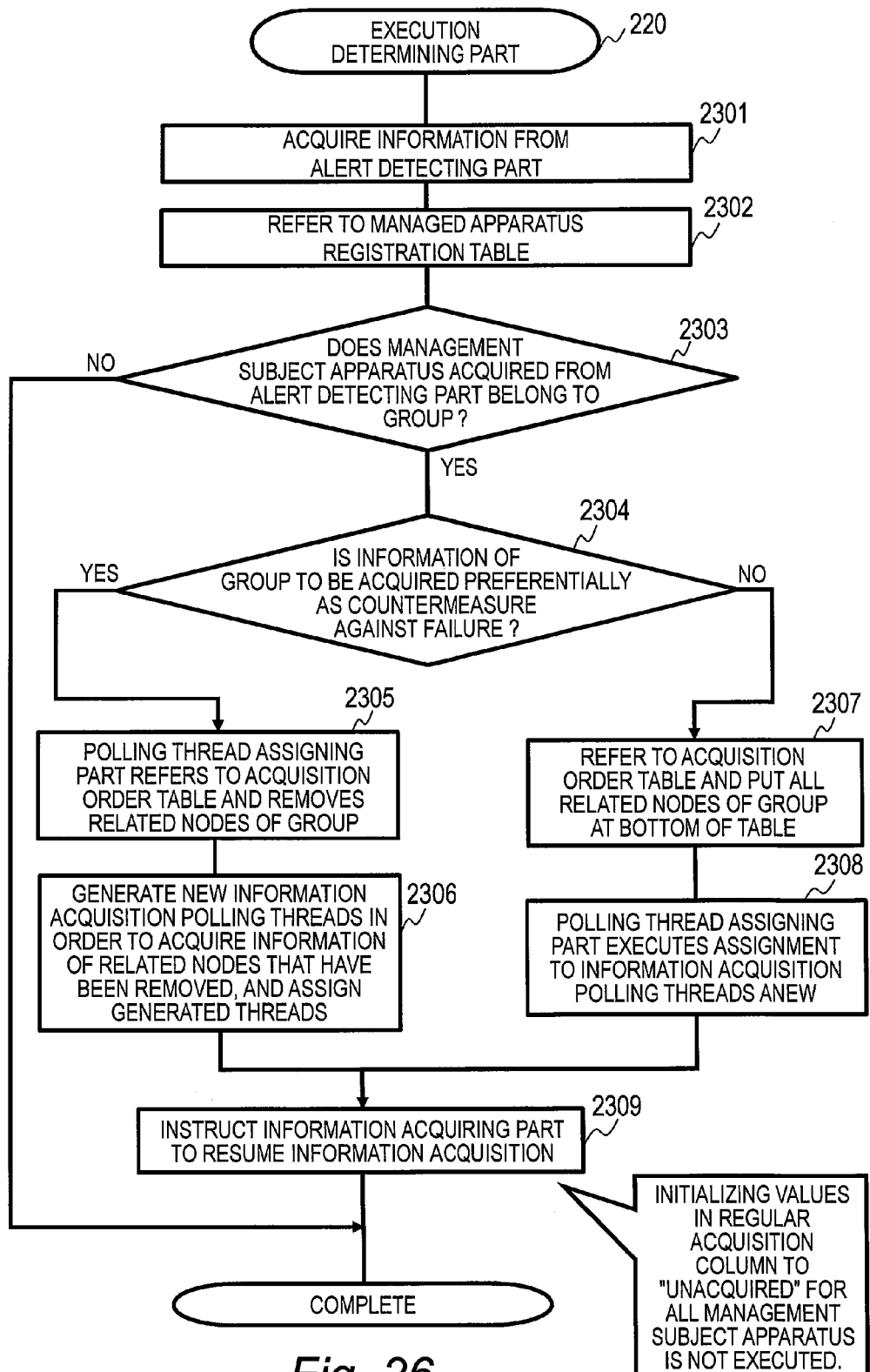
FIG. 26 is a flow chart illustrating an example of processing that is executed by the execution determining part according to the third embodiment of this invention.

FIG. 26 is a flow chart illustrating an example of processing that is executed by the execution determining part 220 of the management server 101. The execution determining part 220 of the management server 101 executes this processing with the notification of the alert detecting part 219 in Step 2104 of FIG. 25 as a trigger.

In Step 2301, the execution determining part 220 acquires the information of the management subject apparatus which has been handed over from the alert detecting part 219.

In Step 2302, the execution determining part 220 refers to the managed apparatus registration table 222. The execution determining part 220 identifies in this step a related group of the management subject apparatus whose information has been handed over from the alert detecting part 219.

In Step 2303, the execution determining part 220 determines whether or not there is a related group that is related to the management subject apparatus whose information has been handed over from the alert detecting part 219. The execution determining part 220 proceeds to Step 2304 when the related group is found, and ends the processing of the execution determining part 220 when the related group is not found.

In Step 2304, the execution determining part 220 determines whether or not, as a countermeasure against the failure, information is to be acquired preferentially from the related group whose presence has been determined in Step 2303. The determination uses information stored in the column 908 of the acquisition group table 224 of FIG. 9 which indicates whether or not information acquisition is given priority in case of failure. The execution determining part 220 proceeds to Step 2305 when the value of the column 908 is "given priority" in an entry that holds the group ID (901) of the identified related group, and proceeds to Step 2307 otherwise.

In Step 2305, the polling thread assigning part 218 refers to the acquisition order table 225, removes related nodes in the related group from the acquisition order table 225, and proceeds to Step 2306.

In Step 2306, the polling thread assigning part 218 generates new information acquisition polling threads 231 for the related nodes that have been removed in Step 2305, and assigns the generated threads to the related nodes. The processing then proceeds to Step 2309.

In the case where information acquisition is not to be given priority, the execution determining part 220 refers to the acquisition order table 225 in Step 2307, puts all related nodes in the related group at the bottom of the acquisition order table 225, and proceeds to Step 2308.

In Step 2308, the execution determining part 220 sends an instruction to the polling thread assigning part 218 to execute again the assignment to the information acquisition polling threads 231. The execution determining part 220 updates the order of assigning the information acquisition polling threads 231 in the updated acquisition order table 225, and then proceeds to Step 2309.

Instead of changing the order of related nodes in the acquisition order table as in Steps 2307 and 2308, the related nodes may be removed from the acquisition order table and newly generated information acquisition polling threads may be assigned as in Steps 2305 and 2306.

In Step 2309, the execution determining part 220 issues a command to the information acquiring part 213 to resume information acquisition. Step 1601 where the information acquiring part 213 changes values in the regular acquisition column to "unacquired" for all management subject apparatus is omitted in the resumed information acquisition.

As described above, in the third embodiment, when an alert to a failure that has occurred is issued while information is acquired, the order of subsequent information acquiring processing is changed in a manner that accommodates the failure. This makes it possible to prevent an overall delay in information acquiring processing as well as an alert storm, and to preferentially acquire information that is useful for failure analysis.

Fourth Embodiment

A fourth embodiment of this invention is configured so that information acquisition load on the management server 101 can be lessened by using at least one server that is not the management server 101 to generate information acquisition polling threads and acquire information of management subject apparatus.

Figure 27:
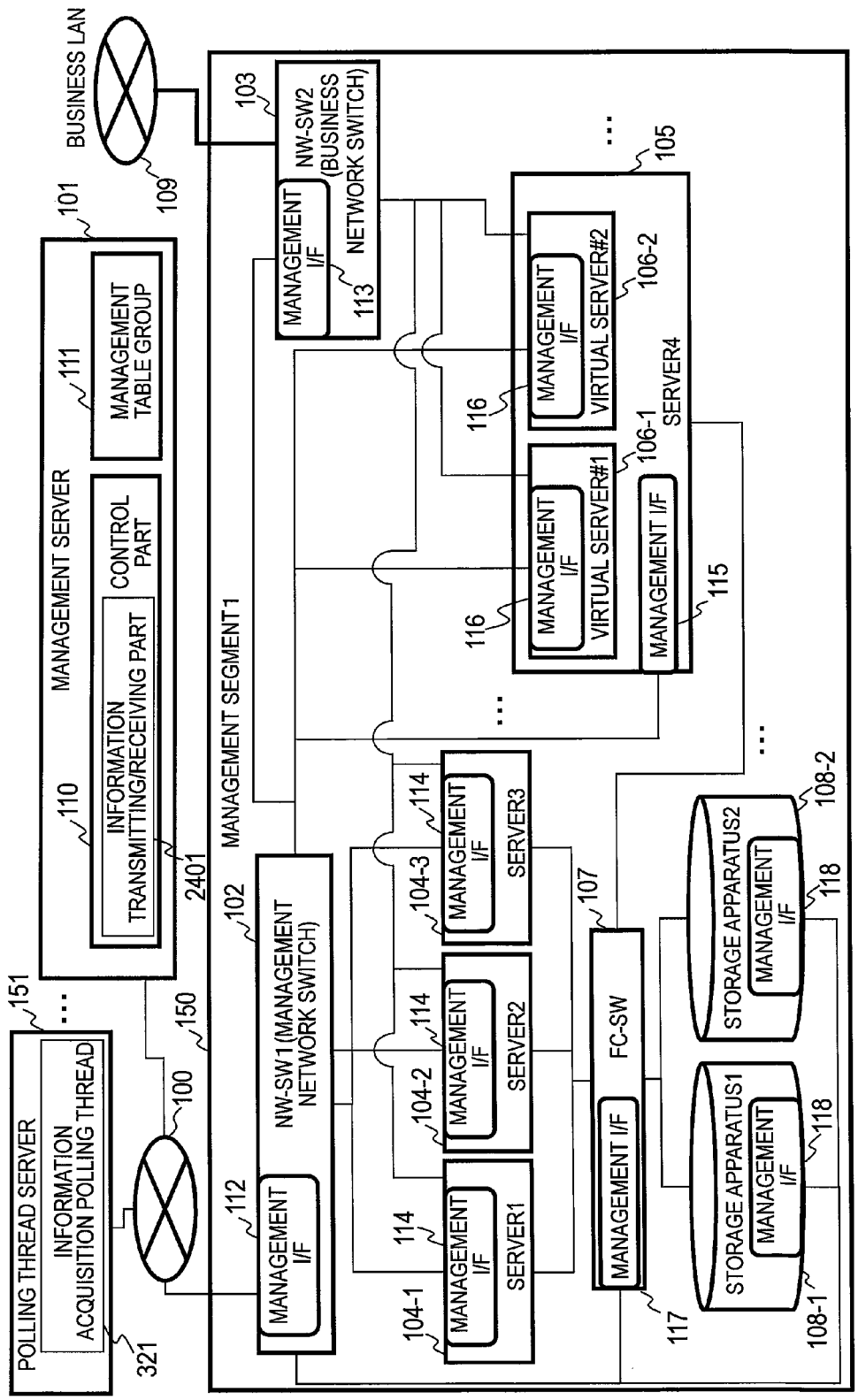
FIG. 27 is a block diagram illustrating an example of a computer system according to a fourth embodiment of this invention.

FIG. 27 is a block diagram illustrating an example of a computer system according to the fourth embodiment.

The computer system used in the fourth embodiment differs from the computer system of the first embodiment in that at least one polling thread server 151 is included, that an information transmitting/receiving part 2401 for transmitting and receiving information between the management server 101 and the polling thread server is added to the control part 110 of the management server 101, and that the information acquiring part 213 and the information acquisition polling threads 231 are moved to the polling thread server 151. The rest of the configuration is the same as in the first embodiment. It should be noted that this invention does not exclude a mode in which the information acquiring part 213 and the information acquisition polling threads 231 remain in the management server 101.

Figure 28:
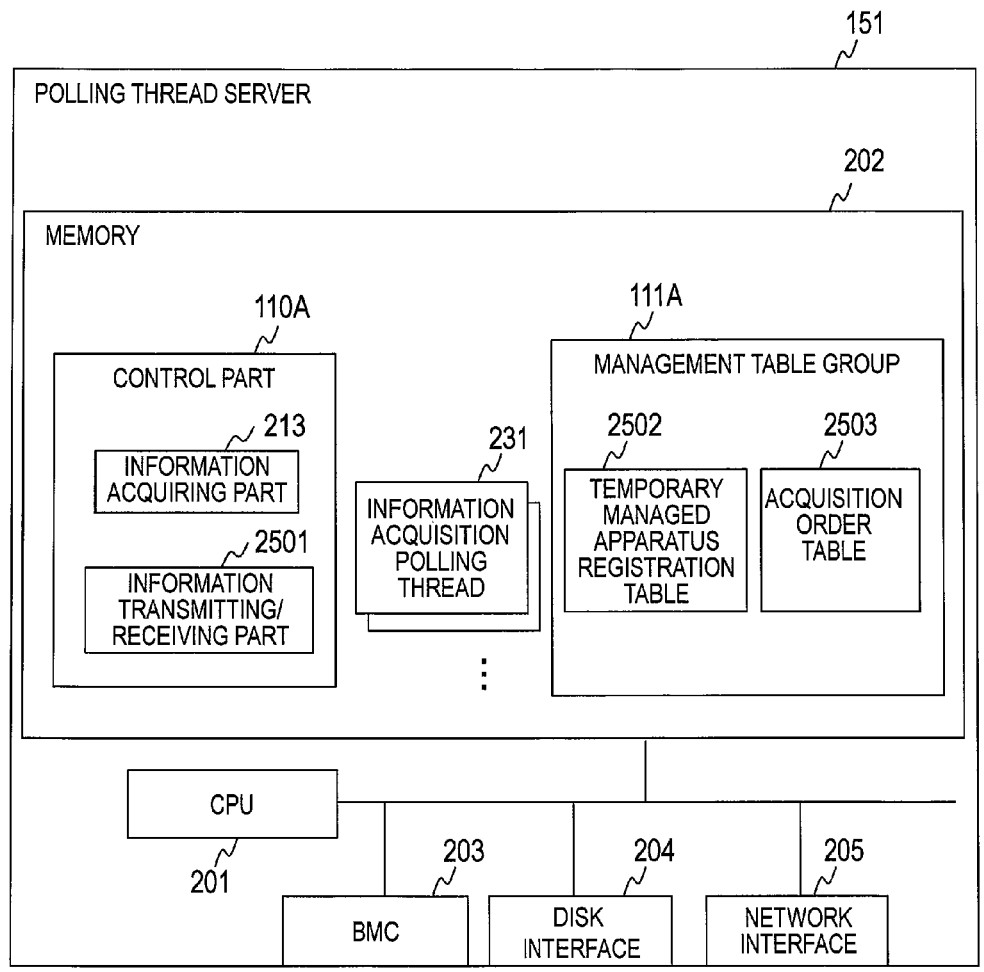
FIG. 28 is a block diagram illustrating an example of the polling thread server according to the fourth embodiment of this invention.

FIG. 28 is a block diagram illustrating an example of the polling thread server 151. The configuration of the polling thread server 151 is the same as that of the management server 101 in the first embodiment, except that the polling thread server 151 stores the information acquiring part 213 and an information transmitting/receiving part 2501 in a control part 110A, and that a temporary managed apparatus registration table 2502 and an acquisition order table 2503 are stored in a management table group 111A.

Figure 29:
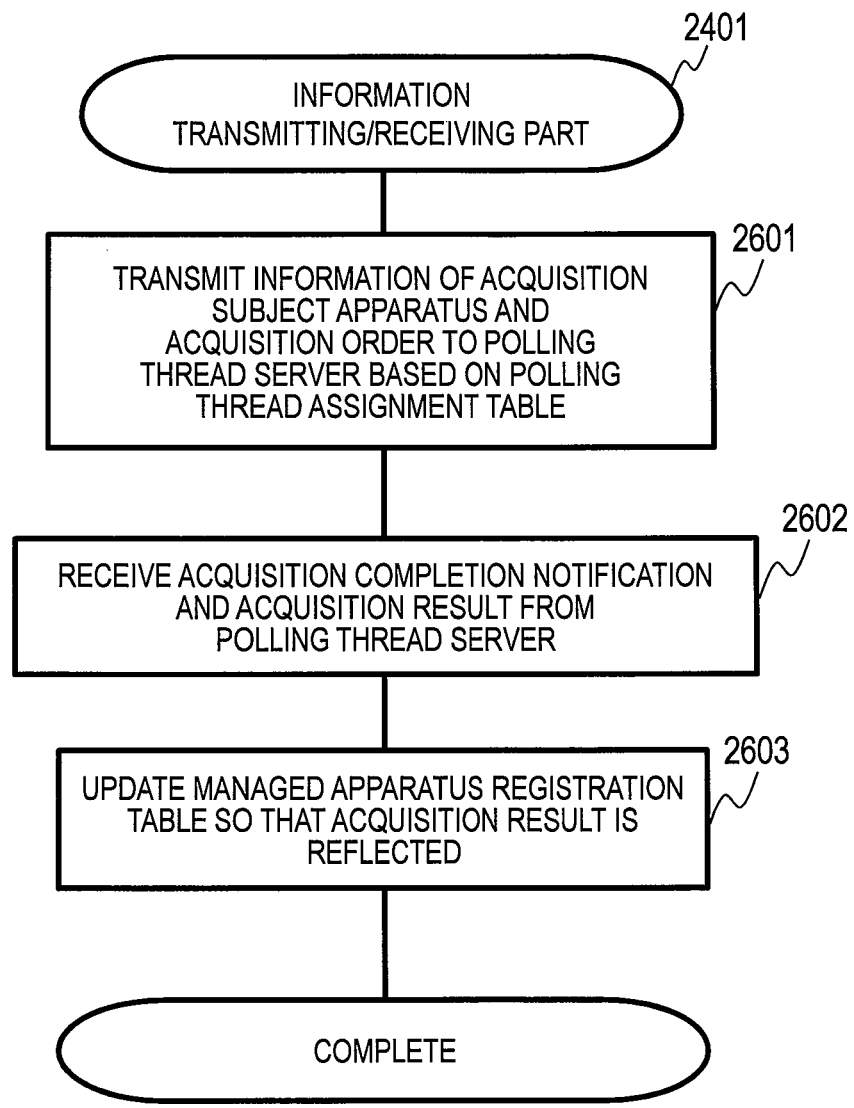
FIG. 29 is a flow chart illustrating an example of processing that is executed by the information transmitting/receiving part on the management server according to the fourth embodiment of this invention.

FIG. 29 is a flow chart illustrating an example of processing that is executed by the information transmitting/receiving part 2401, which is included in the control part 110 of the management server 101.

In Step 2601, the information transmitting/receiving part 2401 transmits, to the polling thread server 151, information about management subject apparatus from which information is to be acquired and information about the order of acquiring information of the management subject apparatus, based on the polling thread assignment table 228, at the time when the polling thread assigning part 218 notifies the completion of its processing to the information acquiring part 213 in Step 1906 in the first embodiment.

In Step 2602, the information transmitting/receiving part 2401 receives from the polling thread server 151 a notification of the completion of configuration information acquisition and the result of acquiring configuration information.

In Step 2603, the information transmitting/receiving part 2401 updates the managed apparatus registration table 222 so that the information acquisition result acquired in Step 2602 is reflected on the managed apparatus registration table 222.

Through the processing described above, the management server 101 can ask the external polling thread server 151 to acquire information of management subject apparatus.

While the managed apparatus registration table 222 is stored on the management server 101 in the example described above, the managed apparatus registration table 222 may be stored in a shared storage area of a storage apparatus (not shown) coupled to the management LAN 100, to be shared by the management server 101 and the polling thread server 151. In this case, where the management server 101 and the polling thread server 151 share the managed apparatus registration table 222, the reception and reflection of acquisition result in Steps 2602 and 2603 may be omitted if the acquisition result is to be reflected directly on the managed apparatus registration table 222 by the polling thread server 151.

Figure 30:
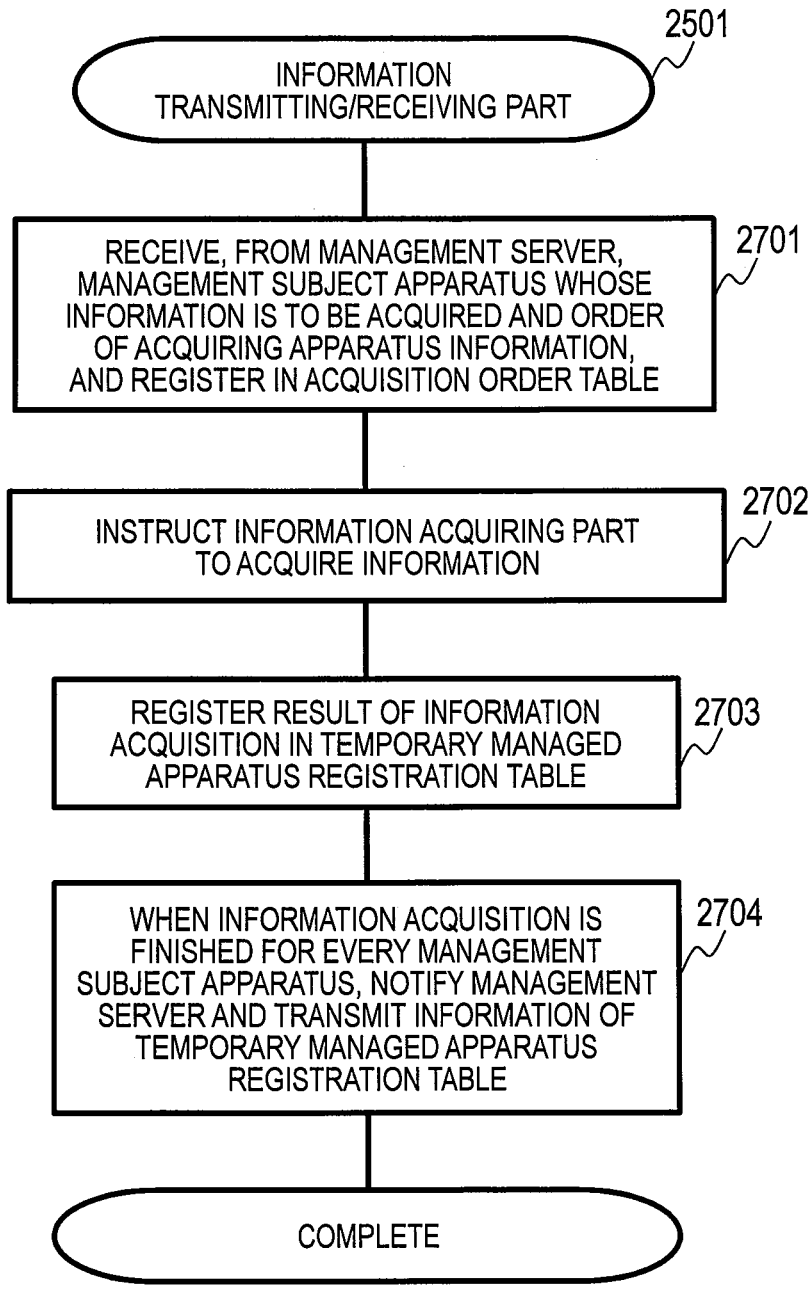
FIG. 30 is a flow chart illustrating an example of processing of the information transmitting/receiving part on the polling thread server according to the fourth embodiment of this invention.

FIG. 30 is a flow chart illustrating an example of processing of the information transmitting/receiving part 2501, which is included in the control part 110A of the polling thread server 151.

In Step 2701, the information transmitting/receiving part 2501 receives, from the management server 101, management subject apparatus whose information is to be acquired and the order of acquiring information of the management subject apparatus, and stores the received apparatus and acquisition order in the acquisition order table 2503, which is shown in FIG. 32.

In Step 2702, the information transmitting/receiving part 2501 instructs the information acquiring part 213 to acquire information of the management subject apparatus based on what is stored in the acquisition order table 2503. The information acquiring part 213 assigns the information acquisition polling threads 231 to the management subject apparatus in an order written in the acquisition order table 2503 as in the first embodiment, and acquires configuration information of the management subject apparatus sequentially.

In Step 2703, the information transmitting/receiving part 2501 acquires information from the information acquisition polling threads 231, and registers the acquired information in the temporary managed apparatus registration table 2502.

In Step 2704, at the time when information acquisition is finished for every management subject apparatus, the information transmitting/receiving part 2501 transmits a completion notification and information of the temporary managed apparatus registration table 2502 to the management server 101.

The management server 101 updates the managed apparatus registration table 222 so that the configuration information received from the polling thread server 151 in the manner described above is reflected on the managed apparatus registration table 222.

FIGS. 31A and 31B show an example of the temporary managed apparatus registration table 2502. The temporary managed apparatus registration table 2502 is a table in which information acquired by the polling thread server 151 is stored until the polling thread server 151 transmits the acquired information to the management server 101. The temporary managed apparatus registration table 2502 only differs from the managed apparatus registration table 222, which is shown in FIGS. 6A and 6B and which is held by the management server 101, in that related group information (the column 611) and registration status information (the column 612) are not included. The configuration of the other columns in the temporary managed apparatus registration table 2502 is the same as the one in the managed apparatus registration table 222.

FIG. 32 shows an example of the acquisition order table 2503. The acquisition order table 2503 is a table that is referred to by the polling thread server 151 in acquiring information. The acquisition order table 2503 is a part of information in the polling thread assignment table 228 of the first embodiment shown in FIG. 19 that is assigned to the polling thread server 151.

The acquisition order table 2503 stores information about management subject apparatus from which the information acquisition polling threads 231 generated by the polling thread server 151 acquires information. The information acquiring part 213 refers to the acquisition order table 2503 to execute the acquisition of information from management subject apparatus.

A column 2901 of the acquisition order table 2503 stores acquisition numbers. The acquisition numbers indicate an order that is referred to when information is acquired by the information acquisition polling threads 231 and, in this embodiment, apparatus information is acquired in ascending order of values assigned to rows of the table as the acquisition numbers.

A column 2902 of the acquisition order table 2503 stores the identifiers of management subject apparatus (node IDs) whose information is acquired by the information acquisition polling threads 231.

As described above, in the fourth embodiment where at least one polling thread server 151 generates the information acquisition polling threads 231 and uses the generated threads to acquire information, information acquisition load on the management server 101 can be lessened.

What is claimed is:

1. An information acquisition method for acquiring, by a management computer comprising a processor, a memory, and an interface, via a network for coupling the management computer to a plurality of computers, information of the computers,
the information acquisition method comprising:
a first step of setting, by the management computer, in acquisition group information, groups of computers whose information is to be acquired out of the plurality of computers;
a second step of determining, by the management computer, for each of the groups, an order in which information of the computers in the respective group is acquired after determining an order of acquiring information on a group-by-group basis;
a third step of outputting, by the management computer, a command to acquire information of the computers in the determined order; and
a fourth step of acquiring, by an information acquisition executing part, based on the information acquisition command, information of the computers on a group-by-group basis in the determined order.

2. The information acquisition method according to claim 1,
wherein the first step comprises:
a fifth step of setting, by the management computer, constraints to the groups; and a sixth step of associating, by the management computer, the groups and the constraints, and wherein the information acquisition method further comprises:

a seventh step of determining, by the management computer, for each of the groups, whether or not a result of acquiring information from the computers in the respective group by the information acquisition executing part fulfills the constraint associated with the respective group; and an eighth step of executing anew, by the management computer, the acquisition of information of the computers that belong to the respective group, when it is determined that the result does not fulfill the constraint.

3. The information acquisition method according to claim 1, wherein the fourth step comprises:

a ninth step of detecting failure information from one of the plurality of computers and identifying the group that is related to the one of the plurality of computers that has issued the failure information; and a tenth step of changing the order of acquiring information from the computers that belong to the identified group.

4. The information acquisition method according to claim 1, wherein the third step comprises outputting, by the management computer, the command to acquire information of computers in the determined order to a first computer, and wherein the fourth step comprises:

an eleventh step of acquiring information of computers on a group-by-group basis in the determined order by the information acquisition executing part, which is included in the first computer, and transmitting a result of the information acquisition to the management computer; and a twelfth step of receiving, by the management computer, the information acquisition result from the first computer.

5. The information acquisition method according to claim 1, wherein the first step comprises extracting, by the management computer, groups of computers whose information is to be acquired out of the plurality of computers, based on preset policy information, and setting the extracted groups in the acquisition group information.

6. A computer system, comprising:

a management computer including a processor, a memory, and an interface; and a network for coupling the management computer to a plurality of computers, wherein the memory further stores instructions that, when executed by the processor, cause the processor to:

set, in acquisition group information, groups of computers whose information is to be acquired out of the plurality of computers;

determine, for each of the groups, an order in which information of the computers in the respective group is acquired after determining an order of acquiring information on a group-by-group basis;

output a command to acquire information of the computers in the determined order; and acquire, based on the information acquisition command, information of the computers on a group-by-group basis in the determined order.

7. The computer system according to claim 6, wherein the memory further stores instructions that, when executed by the processor, cause the processor set constraints to the groups, associate the groups with the constraints, determine, for each of the groups, whether or not a result of acquiring the information from the computers in the respective group fulfills the constraint associated with the respective group, and when it is determined that the result does not fulfill the constraint, execute anew the acquisition of the information of the computers that belong to the respective group.

8. The computer system according to claim 6, wherein the memory further stores instructions that, when executed by the processor, cause the processor to:

detect failure information from one of the plurality of computers, identify the group that is related to the one of the plurality of computers that has issued the failure information, and change the order of acquiring the information of the computers that belong to the identified group.

9. The computer system according to claim 6, wherein the memory further stores instructions that, when executed by the processor, cause the processor to:

output the command to acquire the information of the computers in the determined order to a first computer, and acquire the information of the computers on a group-by-group basis in the determined order from the first computer.

10. The computer system according to claim 6, wherein the memory further stores instructions that, when executed by the processor, cause the processor to:

extract groups of the computers whose information is to be acquired out of the plurality of computers, based on preset policy information, and set the extracted groups in the acquisition group information.

11. A management computer, comprising:

a processor; and a memory coupled to the processor;

wherein the memory stores instructions that, when executed by the processor, cause the processor to:

set, in acquisition group information, groups of computers whose information is to be acquired out of a plurality of computers coupled to one another via a network;

determine, for each of the groups, an order in which information of the computers in the respective group is acquired after determining an order of acquiring information on a group-by-group basis;

output a command to acquire information of the computers in the determined order; and acquire, based on the information acquisition command, information of the computers on a group-by-group basis in the determined order.

* * * * *